(12) United States Patent
Chan et al.

(10) Patent No.: US 8,924,137 B2
(45) Date of Patent: Dec. 30, 2014

(54) METHOD AND APPARATUS FOR DYNAMIC AIR TRAFFIC TRAJECTORY SYNCHRONIZATION

(75) Inventors: David So Keung Chan, Niskayuna, NY (US); Joel Klooster, Grand Rapids, MI (US); Sergio Torres, Bethesda, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 306 days.

(21) Appl. No.: 13/620,052

(22) Filed: Sep. 14, 2012

(65) Prior Publication Data
US 2013/0085661 A1    Apr. 4, 2013

Related U.S. Application Data

(60) Provisional application No. 61/542,071, filed on Sep. 30, 2011.

(51) Int. Cl.
| | | |
|---|---|---|
| G06F 19/00 | (2011.01) | |
| G08G 5/00 | (2006.01) | |
| G05D 1/10 | (2006.01) | |

(52) U.S. Cl.
CPC ............ G08G 5/0013 (2013.01); G08G 5/0039 (2013.01); Y02E 50/10 (2013.01); Y02T 50/678 (2013.01); Y02E 50/30 (2013.01); G08G 5/0082 (2013.01); G05D 1/104 (2013.01)
USPC ...... 701/120; 701/3; 701/4; 701/14; 701/117; 701/11; 701/411; 701/417; 340/961; 340/963; 340/970; 244/158.1; 244/175; 244/76 R

(58) Field of Classification Search
CPC . G08G 5/0039; G08G 5/0082; G08G 5/0034; G08G 5/0078; G08G 5/045; G01C 23/00; G01C 23/005; G01C 5/005; B60G 17/04; B62D 49/0607; B62D 7/02; B62D 7/06; C10G 2400/10; C10G 5/12; G01S 13/345

USPC .......................... 701/3, 4, 11, 14, 17, 13, 411
See application file for complete search history.

(56) References Cited

U.S. PATENT DOCUMENTS

| | | | |
|---|---|---|---|
| 6,043,756 A | 3/2000 | Bateman et al. | |
| 7,248,949 B2 * | 7/2007 | Love et al. | 701/4 |

(Continued)

OTHER PUBLICATIONS

Klooster, J. et al; "Trajectory synchronization and negotiation in Trajectory Based Operations"; Digital Avionics Systems Conference (DASC), 2010 IEEE/AIAA 29th (Utah); Oct. 3-7, 2010, pp. 1.A.3-1-1.A.3-11.

(Continued)

*Primary Examiner* — Redhwan k Mawari
(74) *Attorney, Agent, or Firm* — Ronald E. Prass, Jr.; Prass LLP

(57) ABSTRACT

According to aspects of the embodiments, there is provided an apparatus and method to synchronize trajectories from independent systems such as from a flight management system and the ground Air traffic control during the entire history of a flight. Since a number of trajectory discrepancy factors will intervene during the lifetime of a flight, such as a change in flight intent, controller intervention, or large deviations of the actual flight from the predicted trajectory due to prediction errors, there is need to dynamically monitor these deviations and control a dynamic synchronization cycle. A dynamic trajectory synchronization algorithm attempts to bring each of the systems back into balance whenever a disturbance causes an imbalance. Disturbances include deviation of atmospheric conditions from predicted, change of pilot preference, and unpredicted events requiring controller action, such as need for separation from other aircraft or change in convective weather, special use airspace, or scheduling requirements.

23 Claims, 10 Drawing Sheets

(56) References Cited

U.S. PATENT DOCUMENTS

| | | | |
|---|---|---|---|
| 7,277,043 B2* | 10/2007 | Arthur et al. | 342/29 |
| 7,499,771 B2* | 3/2009 | Caillaud | 701/3 |
| 7,734,457 B2* | 6/2010 | Deffler | 703/13 |
| 7,835,825 B2* | 11/2010 | Coulmeau et al. | 701/3 |
| 7,904,213 B2* | 3/2011 | Coulmeau | 701/3 |
| 2004/0078136 A1* | 4/2004 | Cornell et al. | 701/120 |
| 2012/0116614 A1* | 5/2012 | Torres et al. | 701/3 |

OTHER PUBLICATIONS

Nilim, Arnab et al. "Trajectory-based Air Traffic Management (TB-ATM) under Weather Uncertainty." Proc of 4th USAEurope Air Traffic Management Research Development Seminar (2001) : 11 pages. Print.

* cited by examiner

METHOD AND APPARATUS FOR DYNAMIC AIR TRAFFIC TRAJECTORY SYNCHRONIZATION

BACKGROUND

1. Field of the Disclosed Embodiments

The disclosure relates to air traffic dynamic trajectory synchronization, and in particular the synchronization of air traffic trajectory to correct for disturbances that cause a trajectory change.

2. Introduction

This application claims priority to U.S. Provisional Application No. 61/542,071 entitled "METHOD AND APPARATUS FOR DYNAMIC AIR TRAFFIC TRAJECTORY SYNCHRONIZATION," filed on Sep. 30, 2011, the entire disclosure of which is incorporated herein by reference in its entirety.

This application is related to the following co-pending application, which is hereby incorporated by reference in its entirety: "METHOD AND APPARATUS FOR AIR TRAFFIC TRAJECTORY SYNCHRONIZATION", filed Nov. 9, 2011, U.S. application Ser. No. 13/292,685 to Sergio Torres et al., now U.S. Pat. No. 8,560,148 B2 issued on Oct. 15, 2013.

This application is related to the following co-pending application, which is hereby incorporated by reference in its entirety: "METHOD AND APPARATUS FOR AIR TRAFFIC TRAJECTORY SYNCHRONIZATION", filed Nov. 9, 2011, U.S. application Ser. No. 13/292,685 to Sergio Torres et al.

This application is related to the following application, which is hereby incorporated by reference in its entirety: "METHOD AND APPARATUS FOR AIR TRAFFIC TRAJECTORY SYNCHRONIZATION", filed Nov. 9, 2010, U.S. Provisional Application No. 61/411,628 to Sergio Torres et al.

In trajectory based operations (TBO), air-ground and ground-ground interoperability and trajectory synchronization among the various systems is required since each of these systems rely on an accurate prediction of the flight path in four dimensions (4D trajectory). Without proper synchronization, the ATC/ATM management of the airspace is forced to add significant uncertainty into its prediction of the aircraft trajectory, thus decreasing the potential capacity of the available airspace and the efficiency of operations. The uncertainty that results from air-ground and ground-ground trajectory discrepancies also leads to non-optimal tactical intervention. The goal of air-ground (or ground-ground) trajectory synchronization is to produce trajectories in disparate systems whose discrepancies are operationally insignificant, increasing the likelihood of flying the planned conflict-free and business-preferred trajectories. In addition, if conditions change in the ground requiring alternative trajectories (i.e., projecting for conflict resolution or schedule management, for instance), then the ATC/ATM systems have to be able to independently build new trajectories that satisfy the requirements and preferences of the FMS-generated trajectories.

During periods of relative changes of the different platform the initial synchronized trajectories could lose synchronization and need to be updated. The disclosed method and apparatus solves the problem of maintaining trajectories synchronized from independent systems such as from FMS and ground ATC during the entire history of the flight. Since a number of trajectory discrepancy factors will intervene during the lifetime of a flight, such as a change in flight intent, controller intervention, external forces, or large deviations of the actual flight from the predicted trajectory due to prediction errors, there is need to dynamically monitor these deviations and control a dynamic synchronization cycle.

SUMMARY

According to aspects of the embodiments, there is provided an apparatus and method to synchronize trajectories from independent systems such as from a flight management system and the ground Air traffic control during the entire history of a flight. Since a number of trajectory discrepancy factors will intervene during the lifetime of a flight, such as a change in flight intent, controller intervention, or large deviations of the actual flight from the predicted trajectory due to prediction errors, there is need to dynamically monitor these deviations and control a dynamic synchronization cycle. A dynamic trajectory synchronization algorithm attempts to bring each of the systems back into balance whenever a disturbance causes an imbalance. Disturbances include deviation of atmospheric conditions from predicted, change of pilot preference, and unpredicted events requiring controller action, such as need for separation from other aircraft or change in convective weather, special use airspace, or scheduling requirements.

DETAILED DESCRIPTION OF THE DISCLOSED EMBODIMENTS

Figure 1:
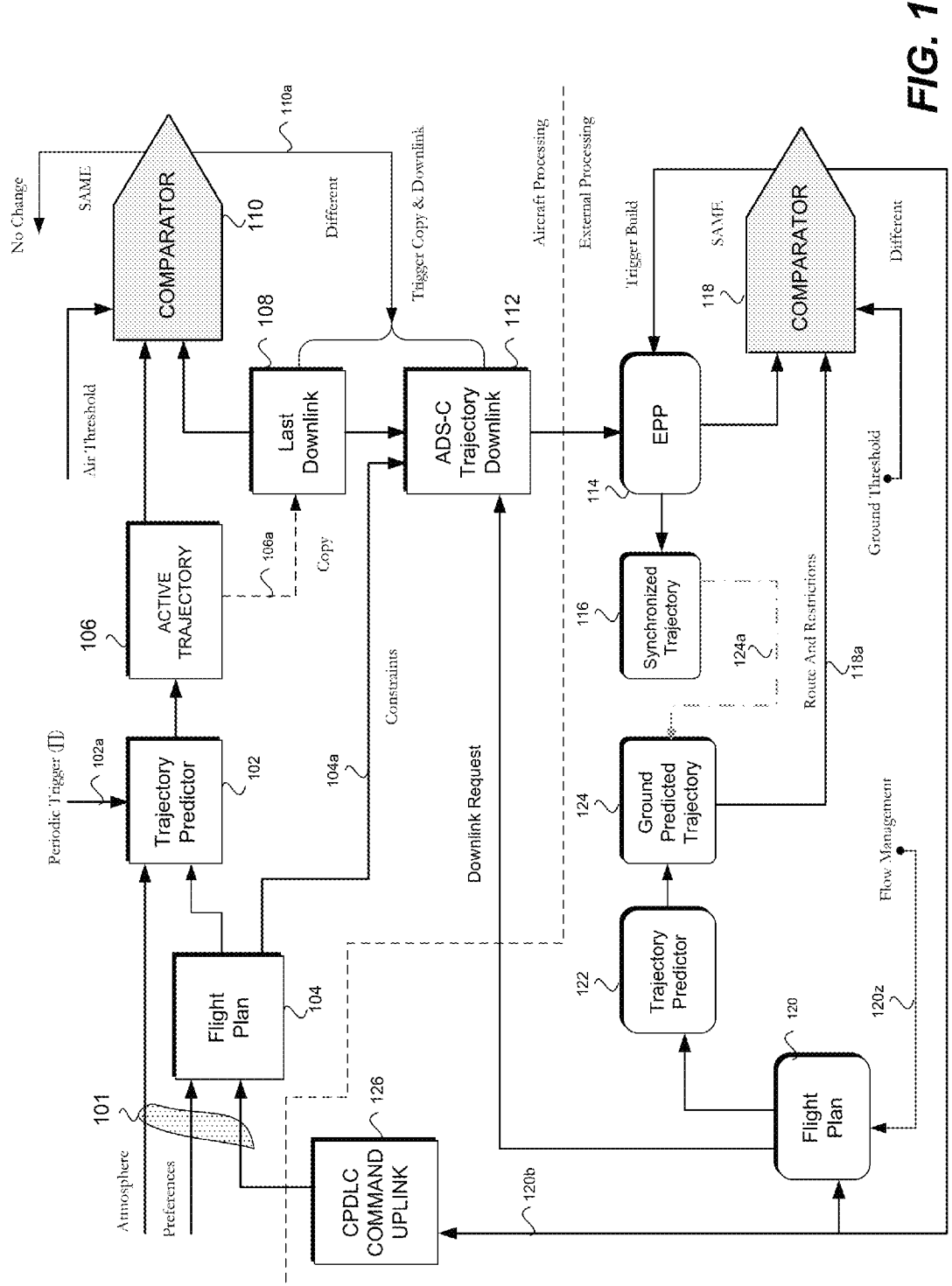
FIG. 1 is a block diagram of a dynamic trajectory synchronization process in accordance to an embodiment.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

In the following description, for purposes of explanation and not limitation, specific details are set forth, such as particular networks, communication systems, computers, terminals, devices, components, techniques, data and network protocols, software products and systems, operating systems, development interfaces, hardware, and the like in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description.

Although embodiments of the invention are not limited in this regard, discussions utilizing terms such as, for example, "processing," "computing," "calculating," "determining," "applying," "receiving," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of resistors" may include two or more resistors.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Aspects of the disclosed embodiments relate to a method to maintain trajectory synchronization by performing activities such as comparing an active trajectory with a synchronized trajectory, wherein the comparison is triggered by at least one disturbance, periodic trigger, or air-ground communication event such as a CPDLC downlink/uplink; if the comparing indicates a difference between the active trajectory and the synchronized trajectory, then performing the actions of updating the synchronized trajectory with the active trajectory; and downlinking the synchronized trajectory or uplinking a command to modify a flight plan to an external system which would result in a change to the trajectory.

In yet another aspect a system to maintain trajectory synchronization, the system comprising a computer executing an interface to exchange data between an aircraft and a ground system, wherein the exchanged data relates to a series of points associated with various flight points or trajectory change points for an aircraft; and a processor coupled to a memory, wherein the memory comprises program instructions that cause the processor to perform operations comprising: comparing an active trajectory with a synchronized trajectory, wherein the comparison is triggered by at least one disturbance, periodic trigger, or air-ground communication event such as a CPDLC downlink/uplink; if the comparing indicates a difference between the active trajectory and the synchronized trajectory, then performing the actions of: updating the synchronized trajectory with the active trajectory; and downlinking the synchronized trajectory or uplinking a command to modify a flight plan to an external system.

Still another aspects of the disclosed embodiments relate to a method to maintain trajectory synchronization between an aircraft system and a ground system, the method by performing activities such as when a trajectory downlink is received, initiating a comparison process where the downlinked trajectory is compared to the synchronized trajectory and a flight plan for the aircraft, and if the comparison indicates a difference between the synchronized trajectory and the flight plan, and then initiating a synchronization process, else a local synchronized trajectory is updated with the downlinked trajectory.

In still yet another aspect of the disclosed embodiments relate to a non-transitory machine-accessible medium that provides instructions to maintain trajectory synchronization between an aircraft system and a ground system, which when accessed, cause a machine to perform operations, the non-transitory machine-accessible medium comprising: code for causing at least one aircraft computer to perform the action of when a disturbance or an uplink is received from a ground system comparing an active trajectory with a synchronized trajectory, and if the comparing indicates a difference between the active trajectory and the synchronized trajectory, then performing the actions of: updating the synchronized trajectory with the active trajectory and downlinking the synchronized trajectory; code for causing at least one ground computer to perform the action of when a downlink is received, initiating a comparison process where the downlink is compared to a downlinked synchronized trajectory and a flight plan for the aircraft, and if the comparison indicates a difference between the synchronized trajectory and the flight plan, and then initiating a synchronization process, else a local synchronized trajectory is updated with the downlinked synchronized trajectory; wherein the disturbance is at least one of a change detected by an aircraft, change data from an external source, or a periodic trigger; wherein the change detected by an aircraft is at least one of atmospheric condition change, pilot input change, airline input change, or other state measurement; wherein the change data from an external source is at least one of flow management, a separation from other aircraft command, change in convective weather, a conflict with a special use airspace, a scheduling requirement, a trajectory downlink, or a command uplink; wherein comparing the downlinked synchronized trajectory with a flight plan is matching a plurality of parameters comprising ground route, lateral route, altitude restrictions, and speed restrictions; wherein the synchronization process performs ground initiated amendment to the flight plan and uplinking of a command to the aircraft to modify its plan only after a substantial or all discrepancies between the flight plan and the downlinked synchronized trajectory are resolved. The uplink/downlink is a communication event between the different trajectory systems.

The disclosed embodiments may concern synchronizing the distinct trajectories as one of the platform is subjected to changes. Dynamic trajectory synchronization adjusts to the changes imposed on one of the independent trajectory system. At the highest level, the trajectory synchronization system is composed of two trajectory predictors, a communications interface between the two predictors and a synchronization processor that hosts the synchronization logic. The two trajectory predictors could be any two trajectory predictors, they could be a ground-ground pair, an air-ground pair or an air-air pair ("air" and "ground" here are used to denote the trajectory predictor in the air system and the trajectory predictor in the ground system respectively). To facilitate the discussion and without loss of generality, reference will be made to an air-ground synchronization system. Dynamic synchronization is achieved by means of a control loop that uses a shared reference trajectory (henceforth called the synchronized trajectory) and a monitoring function (on both, the air and ground) to detect discrepancies between each system's internal trajectory (or internal flight plan/flight intent) and the shared synchronized trajectory. When such discrepancies are detected, the monitoring function triggers an operation that rebuilds the synchronized trajectory. Internally, each system (the ground or the air) maintains its own trajectory but one of the systems (the master system) is deemed to have a more accurate representation of how the flight plan will be executed. The master system is the system that builds and maintains the synchronized trajectory. In this discussion the air system is considered the master; the ground system will keep a copy of the synchronized trajectory and will use it for internal operations until such time when a controller initiated flight plan change is initiated. In this case the controller communicates the changes to the pilot and the response to these changes will be reflected in a new trajectory prediction internal to the FMS, which in turn results in a new synchronized trajectory (in the air); The synchronized trajectory is communicated to the ground system which subsequently builds its own copy for use in the ground system. The monitoring functions in the ground and air systems operate continuously, thus at any time that a change to the flight occurs a new synchronized trajectory is generated and the air and ground systems therefore work with a consistent trajectory prediction.

The term "operator" as used herein refers to an airline, a cargo operator, a business jet operation, a military operator, or the pilot in single pilot operations.

The term "communication", or "message" as used herein refers communications through Automatic Dependent Surveillance-Contract ("ADS-C"), Controller Pilot Data Link Communications ("CPDLC"), Aeronautical Radio Incorporated (ARINC) devices, radio frequency devices, microwave devices, and/or the like.

Provided below is an example of acronyms found in trajectory synchronization: Air Traffic Management (ATM); Flight Management System (FMS); Air Traffic Control (ATC); En Route Automation Modernization (ERAM); Common Automated Radar Terminal System (Common ARTS); Trajectory Based Operations (TBO); Air Navigation Service Provider (ANSP); US Next Generation Air Transport System (NextGen); Single European Sky ATM Research (SESAR); 4D Trajectory for Data Link (4DTRAD); automatic flight control system (AFCS); Flight Path Intent Service (FLIP-INT); 4-Dimensional Trajectory (4DT) in space (latitude, longitude, altitude) and time; message (Msg); Special Activities Airspace (SAA); Traffic Flow Management (TFM); Trajectory predictor (TP); Flight Information Region (FIR); Extended Projected Profile (EPP); and "Will Comply" (WILCO).

The disclosed embodiments may concern synchronizing the distinct trajectories predicted by the aircraft Flight Management System (FMS), the ground Air-Traffic Control (ATC) system and other Air Traffic Management (ATM) systems. Previous trajectory synchronization approaches can be classified according to the type of data that is exchanged:
 (a) Flight Intent,
 (b) Aircraft Intent (AI),
 (c) Behavior Model, or
 (d) Predicted Trajectory.

Flight intent may primarily be the information carried by the flight plan (such as lateral waypoints and cruise altitude) but it is insufficient for accurate synchronization because it does not contain enough information to build from it an unambiguous rendition of the predicted trajectory in four dimensions (4D) (i.e., multiple dissimilar trajectories can be generated from the same flight plan). Some attempts have been made to improve the near-range estimation capability of the ground-based systems based solely on the flight intent and tracking information, but more accurate levels of synchronization are achievable with better air-ground information exchange.

Aircraft intent-based trajectory synchronization may rely on using the FMS provided Aircraft Intent (AI) that specifies the guidance modes and control instructions needed to build the 4D trajectory that executes the flight plan. However, often times the ground system has more situational information than the FMS (i.e. restrictions and background traffic) and needs to work with a trajectory that reflects all of the knowledge available by the ground system; secondly, even though two trajectory predictors can start with the same AI inputs, differences in weather forecast models and aircraft performance models (APM) could result in significantly different 4D predictions.

The amount of Aircraft Intent (AI) data and frequency with which it must be exchanged to synchronize trajectories may also be prohibitive using existing data links. Moreover, exchanging only AI information to modify the aircraft's trajectory may result in a trajectory that is not possible for the aircraft to fly if different APMs are used. Using AI to specify the trajectory also removes the potential to allow flexibility for the aircraft to optimize its trajectory within known constraints. Similar drawbacks affect the exchange of aircraft behavior model data as a means for trajectory synchronization. The fourth synchronization approach, consisting of downlinking the FMS predicted 4D-trajectory and using it "as is" by the ground systems has the advantage that it may encode user preferences. However, this approach is limited by the fact that the FMS 4D-trajectory is a prediction for current conditions and constraints only, and if conditions change in the ground that require building alternative trajectories the 4D-trajectory has to be discarded and a completely new trajectory has to be built in the ground, opening the possibility for breaking synchronization.

The disclosed embodiments may provide a process for trajectory synchronization based on sequential stages coordinated by the ground ATC. The following stages may describe the process for air-ground trajectory synchronization only (a similar process is used for ground-ground trajectory synchronization): A. Pre-departure/pre-FIR (Flight Information Region) crossing phase: (a) Initial trajectory request: upon reception of the flight plan by the ground system and having reached a time which is a settable number of minutes before the estimated departure time (if the flight is internal to the facility or the extended facility—i.e. the NAS—) or before the FIR crossing, the ground system issues a trajectory request to the air system; the FMS trajectory may be down-linked to the ATC system; (b) Verification of route agreement: the FMS trajectory may be compared with the ground system trajectory in order to detect discrepancies in the latitude and longitude information that defines the 2D route. Trajectory comparison may be achieved with a cusp-to-cusp (where a cusp represents a trajectory change point) differencing method consisting of the following steps:
 (a) Selecting a portion (or one or more portions) of trajectory where synchronization is desired (the complete trajectory may not be subject to synchronization, for instance if the flight is leaving the controlled airspace);

(b) Calling T1 the FMS trajectory, calling T2 the ground trajectory;
(c) Traversing T1 in cusp order, for each cusp perpendicularly project the 2D position of the cusp on T2 (if there is no perpendicular projection then selecting the nearest point as the 'projection' point);
(d) Computing the 2D distance between the cusp and the projection point;
(e) If the distance is greater than a threshold, then flagging this cusp as discrepant;
(f) Repeating for all cusps of T1;
(g) Repeating the above steps but this time traversing T2;
(h) Reporting the discrepant cusps.

For all discrepant cusps in the FMS trajectory (T1):
(a) If the cusp is required in T2 and is missing in T1, create an instruction to insert the cusp (for example, specifying it as a latitude/longitude or place/bearing/distance) in the FMS;
(b) If the cusp is required in T2 and is incorrectly located in T1, create an instruction to remove the incorrectly located cusp and insert a new cusp
(c) If the cusp is in T1 and not in T2 and does not violate any restriction in T2 (such as a Special Activity Airspace), insert the cusp in T2.

If necessary, request a new 4DT downlink from the FMS to update T1 with the new lateral cusps.
(a) (c) Verification of restriction compliance: after the lateral route is synchronized, the FMS trajectory may be verified to make sure that it complies with altitude and speed restrictions:
(b) Traversing the cusps in T2 for which a constraint applies, determine the equivalent location in T1 (either by finding the corresponding named lateral fix in T1, or interpolating between bounding cusps in T1).
(c) Compute or extract the altitude and/or speed at equivalent location in T1.
(d) If the T1 trajectory information contains restriction information, extract that restriction information.
(e) Compare the altitude and/or speed at the equivalent location in T1 to the constraint requirement from T2. If the altitude/speed in T1 is different from the constraint by more than a specified tolerance, mark the restriction as violated. If T1 contains restriction information (indicating that the FMS has the constraint entered) and the restriction is violated, mark the restriction as unachievable (i.e. the FMS knows about the restriction but cannot meet it, for example due to performance limits).
(f) (d) Instructions may be assembled in order to correct for discrepancies detected in step (b) (if not performed previously) and restriction violations identified in step (c); this instructions may be communicated to the operator (pilot or AOC) via established air-ground communication systems such as CPDLC.
(g) (e) The FMS system may apply the changes identified in step (d);
(h) (f) The air system may down link the FMS trajectory to the ground system (either via a request from the ground system or an automatic trigger on the aircraft); the ground may receive from the aircraft a four-dimensional trajectory (4DT) in space (latitude, longitude, altitude) and time. Given that the main sources of discrepancies expected between the FMS-generated trajectory and the ATC-generated trajectory may be the rates of change in the altitude and speed during takeoff, initial climb, descent, final approach and landing (i.e. the vertical profile), the downlink of the aircraft 4DT may provide the information needed on the ground for reconstruction of realistic alternative trajectories, if needed.
(i) (g) The ground system may build a trajectory using FMS trajectory cusps. An approach to build the synchronized ground trajectory may be to insert cusps with the same geographic location, altitudes and times as those found in the FMS trajectory; two alternatives may be used to set the speeds and accelerations, depending on the available data in the FMS trajectory:
(j) Approximate the segments to be of constant (arbitrary) speed as implied by the segment length and duration; and
(k) Compute the segment acceleration based on the segment length, duration, and wind velocities provided in the FMS trajectory (for instance as specified in the RTCA ADS-C EPP). The errors involved in these two approaches may depend on segment duration, therefore means should be provided to allow in step (d) above for the insertion of additional trajectory points (arbitrary Lat/Lon points) so that long segments in the FMS trajectory can be broken into smaller ones to maintain the required fidelity. Longitudinal prediction errors may grow with time and may have adverse effects in functions (such as conflict probe) that depend on trajectories, therefore accuracy requirements for these functions may dictate the maximum tolerances allowed and in turn the maximum segment length.
(l) B. In flight phase
(m) The steps described below apply for trajectories that have already passed the first synchronization stage:
(n) (h) Initial longitudinal (time) re-conformance: as soon as the ground systems detects an applicable trigger (for example, receive a departure or FIR crossing message, and aircraft OFF message, or a specified period has elapsed) the ground trajectory may be longitudinally re-conformed (cusp times may be recomputed to be consistent with time information provided).
(o) Conformance monitoring: as the flight progresses, a number of situations may arise that result in loss of synchronization (for instance: change in runway assignment, unforeseen wind changes, errors in wind forecast, tactical intervention by the controller, weather reroutes, velocity variance due to cost index, etc.). For this reason, it may be necessary that the ground system checks the sensed position reports provided by the surveillance system against the active trajectory and in cases of out of conformance detections, corrections may be applied to the active trajectory; this operation may entail a re-synch process consisting of the steps a through g above. Alternatively, the aircraft could apply an automatic checking to downlink an updated trajectory and re-initiate a synchronization when a new FMS trajectory is different from a previously downlinked/synchronized trajectory by a specifiable tolerance in any dimension.
(p) (j) Wind synchronization: Air-ground wind model discrepancies may potentially be an additional source of significant errors leading to two type of problems: (1) a synchronized trajectory going out of conformance repeatedly in short time intervals, thus triggering multiple re-synch operations, and (2) an aircraft flying a conflict free synchronized trajectory encountering a real conflict (unpredicted because of wind discrepancies) in the future that will cause tactical intervention and thus nullify the benefits of synchronization (and possibly even introduce penalties). Errors in wind data and discrepancies in wind models between air-ground systems may result in longitudinal errors ($s_x$) that grow with prediction time (T) as $s_x=Ts_v$, where $s_v$=ground velocity error and could become a significant source of error. Discrepancies in wind modeling may result in invalid conflict probe predictions. Using FMS wind data in the ground system may not be an option because conflict predictions of neighboring aircraft using different wind data would result in false or missed alerts. Conflict probe may require the wind model to be consistently applied to all aircraft. If the wind data used by the FMS is made available as part of the FMS trajectory down-link (for instance as specified in the RTCA ADS-C EPP), the ground system may check for consistency of wind models. If in addition to the FMS wind data there is also a wind model age (time since forecast was computed) or wind accuracy (figure of merit) information, the ground system may assess the reliability of the wind data used by the FMS. Accordingly, if the ground systems deems that the wind data used by the FMS is stale or unreliable then the ground system may up-link new wind data to the aircraft to be used by the wind blending algorithms in the FMS; on the other hand if the wind data in the FMS is "fresh" and if there is a significant discrepancy (i.e. large relative to intrinsic wind models errors), then the ground system may add prediction buffers to account for larger prediction errors (conflict probe, for instance, can be performed adding a buffer to accommodate the uncertainty in speed).

The disclosed embodiments may provide a solution to the problems of conventional systems for the following reasons: The disclosed embodiments may take into account user preferences: by using the (restriction compliant and laterally synchronized) down-linked FMS trajectory to build the ground trajectory including all of the optimization choices made by the FMS to build its own trajectory, may be automatically incorporated in the ground system (for instance if the FMS modeled an optimized descent, the vertical profile in the ground system may reflect such optimization). By exchanging a combination of aircraft intent (AI) data and trajectory data, the disclosed embodiments may solve the problems associated with the individual limitations associated with each one of these data items (as described in the previous item). The trajectory synchronization of the disclosed embodiments may be highly dynamic and thus allows for required adjustments that arise in realistic situations.

(a) The disclosed embodiments provide flexibility in the synchronized trajectory allowing the FMS to optimize the trajectory within the synchronized constraints.

(b) The disclosed embodiments may build on current or planned technologies and concepts (CPDLC, data comm., ARINC 702A, SC-214, etc), and may thus allow for an initial implementation in a mixed equipage environment and a smooth evolution of the ATC system towards TBO.

FIG. 1 is a block diagram of a dynamic trajectory synchronization process in accordance to an embodiment. The process can be view as the activities performed at an aircraft, aircraft processing performed by an aircraft computer, and at the ground, ground processing by a ground computer. The details of FIG. 1 show the processing components in the aircraft and ground systems to maintain synchronization between the two entities. Existing components are the flight plan 104 that include performance data such as gross weight, cruise altitude and cost index or other speed specification, trajectory predictor 102, active trajectory 106 component in the aircraft flight management system, plus corresponding flight plan 120, trajectory predictor 122, and predicted trajectory 124 in the ground automation system. The flight plan 104 provides the aircraft with agreed upon inputs for lateral navigation (LNAV) and vertical navigation (VNAV) guidance as is well known to those in the art. Trajectory synchronization components include a synchronized trajectory labeled last downlink 108 and comparator 110 in the aircraft, a synchronized trajectory 116 and comparator 118 on the ground, and downlink 112 and uplink 126 modules. As used herein an uplink is a communication from an external source that may take the form of data, voice, text, or other forms of communication.

If the ground has requested airborne dynamic synchronization monitoring, trajectory synchronization is initiated by activating the comparator 110. This comparator compares the aircraft's active trajectory 106 to its synchronized trajectory such as the last downlink trajectory 108. If there is no synchronized trajectory, the active trajectory 106 must be downlinked by copying 106a to the downlink module 112. Otherwise, if a significant difference is detected 110a, the active trajectory 106 becomes the new synchronized trajectory and is downlinked by downlink module 112 to the ground. Further, note that the constraints 104a which form part of the aircraft flight plan 104 are/could be appended at the downlink module 112 to be included with the synchronized trajectory. Subsequently, the aircraft's comparator 110 is triggered whenever the active trajectory 106 is updated or re-predicted for whatever reason.

A trajectory downlink refreshes the ground's synchronized trajectory 116 through EPP 114 and triggers the ground's comparator 118. The ground's comparator 118 is also triggered (the trigger could be instantaneously, however, a time delay can be added to assure that any possible reacting downlink from the air has been received) when the ground plan or flight plan 120 is changed, likely initiated by the ground, for whatever reason causing the ground predicted trajectory 124 to change. The ground's comparator 118 compares the downlinked trajectory as provided by EPP 114 to the ground predicted trajectory 124 for agreement to route and restrictions 118a. Additionally, the comparison checks the trajectory for compliance with non-flight plan restrictions, such as sector crossing restrictions or special activity airspace. If the comparison is favorable, the synchronized trajectory is copied 124a to the ground predicted trajectory 124 and synchronization is achieved. Otherwise, modification options are created for the ground flight plan 120 and/or aircraft flight plan 104. The choice of which flight plan to modify may be determined algorithmically and executed without controller intervention, or the options may be presented to the controller for selection and approval. The controller may also create its own modification instead. Any modification to the ground flight plan 120 triggers the ground comparator 118 after a possible delay, as noted before.

A modification for the aircraft flight plan is coded into a CPDLC message 120b and uplinked to the aircraft through CPDLC command uplink module 126. If an uplinked message causes a modification to the aircraft's flight plan 104 and subsequent re-prediction (at trajectory predictor 102) of the active trajectory 106, the aircraft's comparator 110 is triggered as noted before, which may then lead to a trajectory downlink 108. The process thus repeats itself as described above. It may be necessary to first cancel the dynamic comparisons on the aircraft; for example, if flight plan change requires multiple CPDLC messages 120b or even if a single CPDLC message 120b results in multiple flight plan edits being performed on the aircraft, which could trigger multiple active trajectory re-computations at trajectory predictor 102 or at active trajectory 106. For example, the signal could be held at trajectory predictor 102 until the flight management system (FMS) at the aircraft determines or is delayed by some many cycles that it should be released The comparison monitoring at comparator 110 can be re-initiated after all necessary changes have been coordinated by invoking a periodic trigger 102a at the aircraft. Alternatively, the FMS may implement logic to detect when multiple trajectory predictions will occur in rapid succession and inhibit downlink of the new trajectories until all changes have been implemented. To guard against an infinite loop, a counter (not shown), at for example EPP 114, keeps track of the number of trajectory downlinks required to achieve synchronization. This counter is incremented after each trajectory downlink 112 and is reset whenever synchronization is achieved or the ground flight plan is modified by the controller. When the counter exceeds a threshold, further automatic sync-related uplink to the aircraft is suspended until the counter is reset.

The comparator 110 may be triggered by disturbances 101 that cause a trajectory change detected by the aircraft monitoring or by changing data on the ground. An aircraft trajectory change may also be caused by periodic updates or re-predictions of the aircraft trajectory (trajectory predictor 102) triggered by the flight management system. A disturbance 101 is at least one of a change detected by an aircraft, change data from an external source, or a periodic trigger. A change detected by an aircraft is at least one of atmospheric condition change, pilot input change, airline input change, or other state measurement or aircraft detected disturbance. Aircraft detected disturbances 101 that may lead to need for re-synchronization include deviation of atmospheric conditions from predicted, or change of pilot or airline inputs.

Disturbances 101 that may be detected by ground monitoring 120z, detected by well known flow management systems, are things such as flow management, and unpredicted events requiring ground intervention, such as need for separation from other aircraft, convective weather, conflict with a special use airspace, or schedule change. However, the trajectory synchronization process, such as comparators 110 and 118, does not need to know what the trigger was that led to a need to check for a re-synchronization; it only needs to know that a re-synchronization check is required.

A possible trajectory comparison algorithm usable in comparator 110 and comparator 118 should initially identify differences in the 2D path as follows:

Identify discrepancies in the 2D path between two trajectories: T1: trajectory 1 such as active trajectory; T2: trajectory 2 such as the synchronized trajectory (i) Perpendicularly (or closest distance if perpendicular does not exist) project T1 cusps on T2 segments; (ii) Perpendicularly (or closest distance if perpendicular does not exist) project T2 cusps on T1 segments; (iii) Find $E^\perp$=the largest perpendicular separation distance between T1-T2 (from previous steps); If $E^\perp < \perp \theta^\perp$: trajectories are synchronized in the horizontal dimension ($\theta^\perp$=threshold) Else, list of distances $di > \theta^\perp$ are identified discrepancies.

Trajectory synchronization thus results in two improved trajectories on the ground, namely, the trajectory predicted by the ground predictor 124, and the ground version of the synchronized trajectory 116 constructed from the aircraft downlink 112. The aircraft performance model used by the aircraft trajectory predictor 102 is often more accurate than the performance data available to the ground trajectory predictor 122 but due to concerns over proprietary performance characteristics by airframe and engine manufacturers the data required to replicate these models in the ground is not made available. For this reason the ground predicted trajectory 124 is often less accurate than the synchronized trajectory in the vertical and longitudinal dimensions. However, the inputs used by the ground trajectory predictor 122 such as, target speed and altitude can be varied to perform "what-if" trial planning, which is important to evaluate the impact of potential trajectory modifications, for example, for use in managing aircraft arrival times to meet a metering schedule, without having to create a synchronized trajectory for each potential modification. On the other hand, the synchronized trajectory is a much more accurate representation of the aircraft's predicted trajectory, but it is a static snapshot that represents the current plan only and is thus not useful for "what-iffing" purposes when a constraint or conflict requires the trajectory to be modified.

Figure 2:
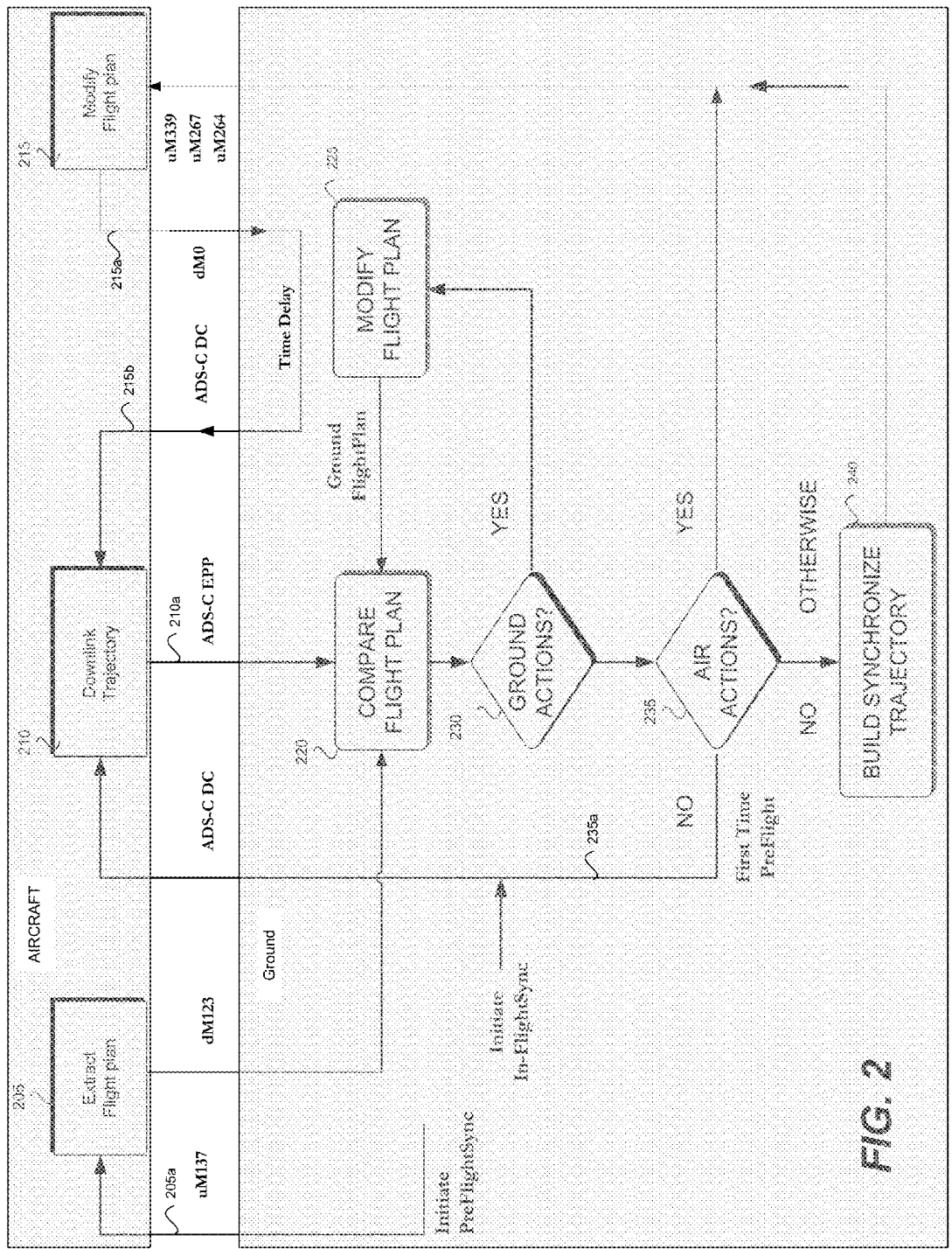
FIG. 2 is a diagram illustrating information exchange at an aircraft and a ground system to accomplish trajectory synchronization in accordance to an embodiment.

FIG. 2 is a diagram illustrating information exchange at an aircraft and a ground system to accomplish trajectory synchronization in accordance to an embodiment. FIG. 2 illustrates the process of creating a synchronized trajectory without an ADS-C event contract. Each sequence involves an uplink message (uM137, uM339, uM267, uM264) from the ground to the air followed by a downlink message (dM123, dM0) from the air to the ground. An uplink message may be a CPDLC message or a message to setup an ADS-C contract, whereas a downlink message may be a CPDLC message or an ADS-C report. These message exchanges enable first the task of synchronizing the common inputs to the air and ground trajectory predictors. Then, information from the last sequence's downlink is used to build the synchronized trajectory 240. The first common trajectory predictor input to be synchronized is the ground, or lateral, route. The ground route consists of a departure segment, an en route segment, and an arrival segment. The departure and arrival segments are specified by a set of airport, runway, and terminal procedure names, some of which may be optional. During preflight, these items are synchronized between air and ground via a first round of message exchange 205a and are embodied in the extracted flight plan 205. Once in flight, however, this first round is skipped because it is assumed that both air and ground are kept informed of any change in arrival airport, runway or procedure by means external to trajectory synchronization. As seen in FIG. 2, the first exchange round begins with the ground sending a message 205a to the air requesting its information regarding the loaded departure and arrival procedures (CPDLC message uM137), followed by the air responding with a downlink (extract flight plan 205) of that information (CPDLC message dM123). Using this information, the ground compares the airport, runway and procedure names between the air (extract flight plan 205) and the ground (modify flight plan 225) in the process called compare flight plan 220. If any difference is found, the correct name to use is determined in ground actions 230, and if this entails any change to the ground, the appropriate amendments to the ground route are applied in process modify flight plan 225. Then, if any amendment to the air is needed as determined by air actions 235, such amendments are sent to the air in a second round of route modification exchanges (CPDLC message uM264, uM267 or uM339) to be performed by process modify flight plan 215, followed by an acknowledgement 215a from the air (CPDLC message dM0 or dM1). If the acknowledgement is positive (dM0 WILCO), a third round of exchange is initiated beginning with the ground sending the air a request (message 215b) for a downlink of the aircraft's predicted trajectory (ADS-C demand contract (DC) setup), followed by the air responding with a downlink 210a of the trajectory along with altitude and speed restrictions that are known by the aircraft (ADSC-C report). However, if no amendment to the air is needed, the second round is skipped, with execution proceeding directly to the third round described above. This third exchange round is also where a round of trajectory synchronization begins if initiated by the ground during flight. With the downlinked information from the third exchange round, which includes the en route path and departure and arrival routes expanded from the procedure names, the ground can compare and synchronize the ground route between air and ground, as described below.

The second trajectory predictor input to be synchronized is altitude and speed restrictions. The downlink from the third round of air/ground exchange described above also provides all restrictions that are known by the air predictor. Therefore, after the third exchange round, the ground is ready to compare altitude and speed restrictions between air and ground in addition to the ground route. In fact, the ground always makes the same two comparisons after receiving a trajectory downlink from the air. First, it compares the lateral route (the sequence of procedures and waypoints, but not the detailed turn information) followed by the air trajectory against that followed by the ground trajectory. Second, it compares the altitude and speed restrictions known by the air trajectory against those applicable to the ground trajectory. If any significant difference is found in either comparison, amendments are generated for the air and/or ground (ground action 230 and modify flight plan 225) to bring the trajectories into alignment. Amendments to the ground are applied first. Then, if no amendment to the air is required, synchronization of trajectory predictor inputs is complete and control passes to building of the synchronized trajectory from the downlinked information at process build synchronized trajectory 240. However, if any amendment to the air is needed, such amendment is sent 235a to the air in a fourth round of exchange, similar to the second exchange round described above, followed by a fifth round of exchange downlinking the predicted trajectory similar to the third exchange round described above. The action performed by the ground after receiving a trajectory downlink from the fifth round is identical to that after the third round. To avoid the possibility of an infinite loop, logic is implemented to prevent re-sending to the air any amendment that has previously been sent with a positive acknowledgement. Thus, a synchronized trajectory is normally built after no more than five rounds of air/ground message exchange in preflight or three rounds during flight.

Figure 3:
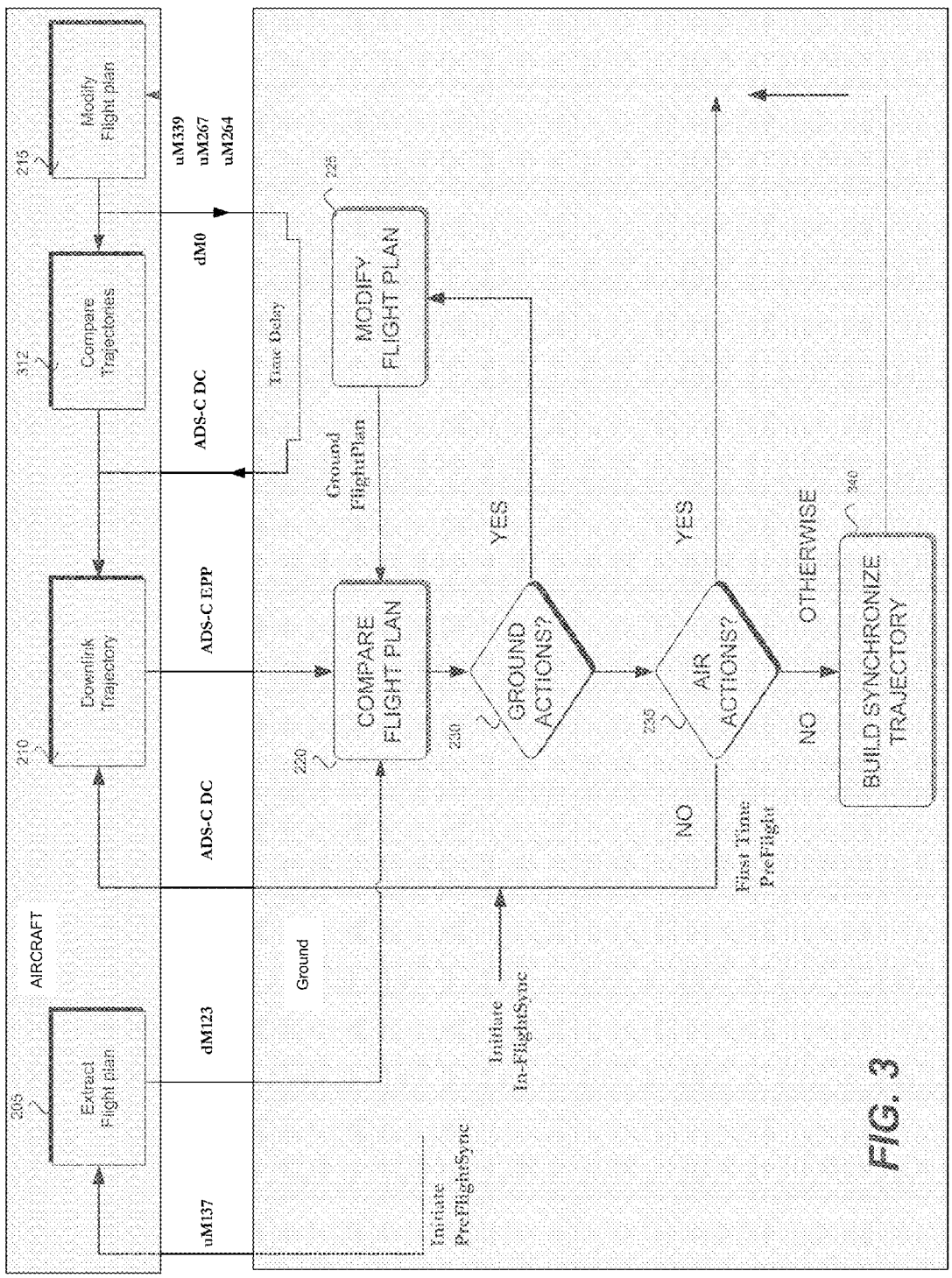
FIG. 3 is a diagram illustrating information exchange with use of ADS-C event contract at an aircraft and a ground system to accomplish trajectory synchronization in accordance to an embodiment.

FIG. 3 is a diagram illustrating information exchange with use of ADS-C event contract at an aircraft and a ground system to accomplish trajectory synchronization in accordance to an embodiment. FIG. 3 shows the modification to FIG. 2 when an ADS-C event contract is used. This embodiment addresses a solution to a potential issue with the scheme described above, that can arise in the relationship between the second and third exchange rounds (or fourth and fifth). The second round uses CPDLC messaging while the third uses ADS-C. These are different messaging systems that are independent of each other. The third message round is intended to capture the aircraft trajectory after amendments from the second round have been applied, but since a WILCO acknowledgement from the second round does not necessarily imply completion of amendment application to a new predicted trajectory, there is no way of guaranteeing that the trajectory downlinked in the third message round was built after the amendments have been applied and therefore encompasses the requested changes. Using an ADS-C event contract instead of a trajectory request from the ground to obtain the desired trajectory solves this problem. An ADS-C event contract obligates the aircraft to downlink its predicted trajectory whenever it differs sufficiently from the last downlinked trajectory. If this trajectory is built because of flight plan amendments from the second message round, then it is guaranteed to capture those amendments. If the amendments result in multiple trajectory iterations (for example, speed and altitude constraints are entered separately and result in the trajectory being re-predicted multiple times before all amendments requested by the ground have been taken into account) logic on the aircraft can inhibit downlinks of the intermediate trajectory until all amendments have been incorporated. In order to ensure that a trajectory is downlinked regardless of the amount of change (so as to complete the synchronization cycle), after sending an amendment the ground can set up a backup trajectory request to be sent a preset time delay after receiving the WILCO. Should a trajectory downlink be received within this time period, the pending trajectory request is cancelled. Otherwise, the backup trajectory request will precipitate a downlink. Correct synchronization does not depend on the time delay setting. Too short a delay simply causes a wasted extra round of messaging, whereas too long a delay simply increases the maximum time required for closure. An alternative method is to have the aircraft send, say, a null trajectory when no sufficiently large change is detected, and have the ground skip to building a synchronized trajectory 340 from previous downlinked information when such a null trajectory is received. However, implementing this would require augmentation to the ADS-C event contract mechanism, since the current specification does not support such a feature. Alternatively, the ADS-C event contract could be setup in such a way to guarantee the new trajectory prediction 210 will always trigger a downlink once a synchronization process has begun, for example, by setting the tolerances for comparison at compare trajectories 312 to a very small value. However, this would require a new event contract to be initiated with more reasonable tolerances once the synchronization process is complete.

Building a synchronized trajectory achieves the objective of preflight trajectory synchronization, and represents the most accurate estimate of what the aircraft will fly given the known conditions and inputs. However, due to the inherent uncertainties of future events and atmospheric conditions, the accuracy of this trajectory decreases with "look-ahead time" (prediction time window into the future) since the aircraft's actual trajectory evolves affected by differences between actual and predicted winds and any change in flight intent resulting from pilot or controller action. Thus, after takeoff, the focus of trajectory synchronization shifts from creating an initial synchronized trajectory to maintaining the accuracy of that trajectory in representing the aircraft's predicted trajectory in response to dynamic disturbances and uncertainties as described in FIG. 1. This new focus is called dynamic trajectory synchronization or modify dynamic trajectory synchronization.

A significant difference between preflight and dynamic trajectory synchronization is that the latter operates in a dynamic environment in which the flight plan such as extract flight plan 205 or trajectories on the ground may be affected at arbitrary times by many independently operating sub-systems. Due to the workload of the pilot and ground controller, as well as the bandwidth constraints associated with the communication of trajectory information, it is important in this environment that air/ground interactions be kept brief, and that multiple interactions are independent of one another. A key attribute of this approach that enables this characteristic is that the ground takes the same action every time a trajectory downlink is received such as from downlink trajectory 210, regardless of what caused the downlink or what happened at other times. Because of this, the independence of the CPDLC and ADS-C messaging systems is not a problem. The linkage established between CPDLC and ADS-C through an ADS-C event contract, with backup from an ADS-C demand contract, suffices. The core air/ground interaction used for dynamic synchronization in this approach is the process that begins with a trajectory downlink 210 from the air (in the form of an ADS-C report), and ends with either the building of a synchronized trajectory, or an uplink command to the air in the form of a CPDLC message and subsequent execution of that command by the air. Each such core interaction is asynchronous and independent of other interactions. Full synchronization requires one or more of these core air/ground interactions and ends with refreshing the synchronized trajectory.

Figure 4:
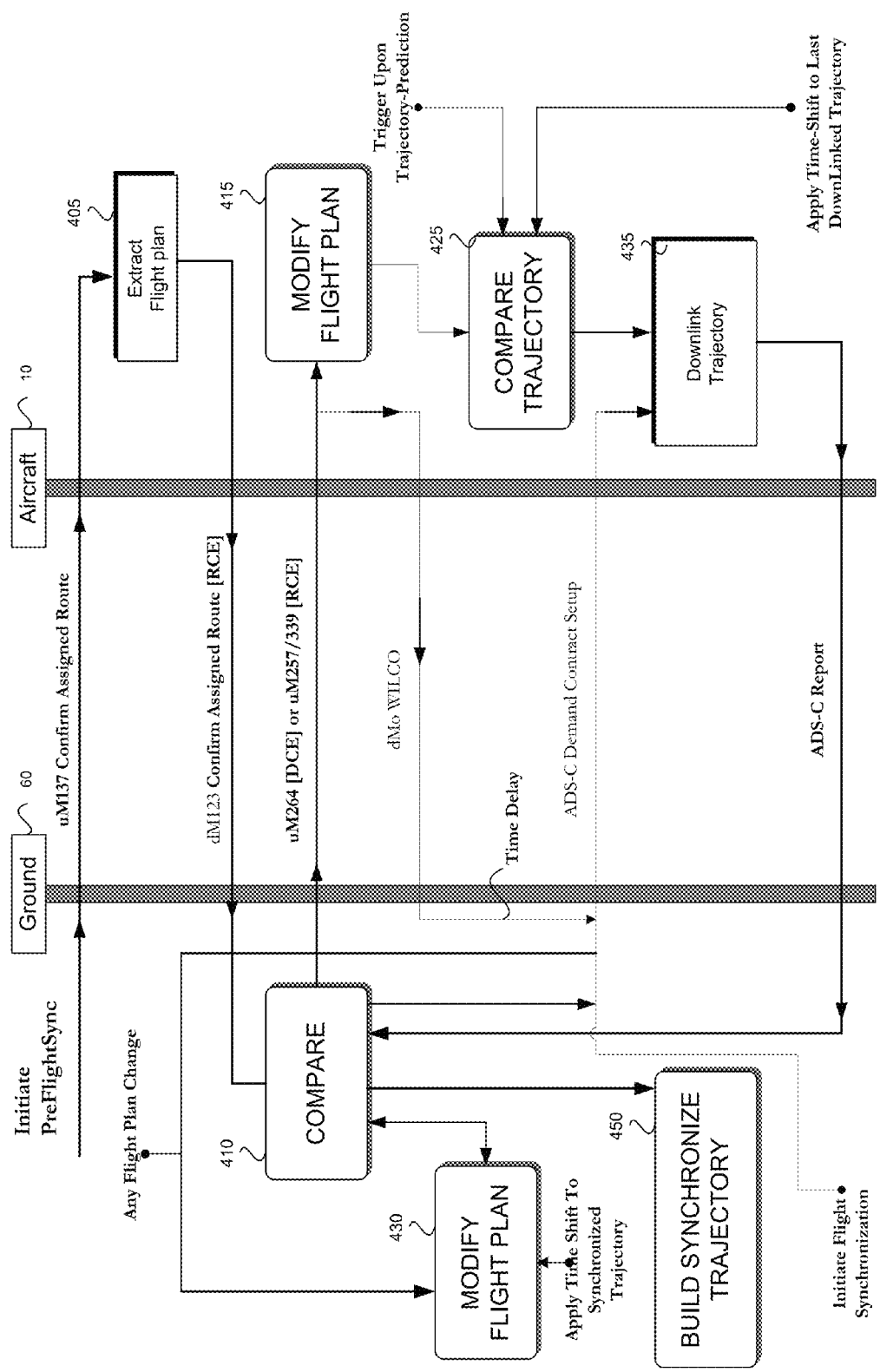
FIG. 4 illustrates a dynamic trajectory synchronization flow diagram with actions in accordance to an embodiment.

FIG. 4 illustrates a dynamic trajectory synchronization flow diagram with actions in accordance to an embodiment. The dynamic trajectory synchronization flow diagram comprises a plurality of processes to monitor and modify trajectories such as for example an extract flight plan 405, ground comparison 410, air modify flight plan 415, a ground modify plan 430, a ground synchronized trajectory 450, an air compare trajectory 425, and a downlink trajectory 435. FIG. 4 presents a summary flow diagram of trajectory synchronization showing various actions to be described below. To determine what action to take, monitors are set up in the aircraft 10 such as process 405, 415, 425, and 435 and on the ground 60 to monitor certain deviations between the previous synchronized or downlinked trajectory and the most recent predicted trajectory or aircraft observation. Whenever such deviations exceed specified thresholds, specific actions such as downlinking the aircraft trajectory 435 are initiated. The primary responsibility for monitoring and action initiation is relegated to the aircraft such as compare trajectory 425, with the ground as backup such as compare 410. This is because the aircraft maintains the most accurate and up-to-date trajectory using actual atmospheric conditions. When thresholds in the air and ground monitors are set up properly relative to each other, initiation of trajectory synchronization from the ground is rarely needed. There are two major advantages to relegating monitoring to the air. First, the air system has more accurate aircraft intent, i.e., knowledge of changes to the future of the predicted trajectory, has access to flight specific user preferences and aircraft specific performance parameters (disturbances 101) both of which should result in more accurate predictions, and the aircraft active trajectory is used to guide the aircraft when LNAV/VNAV is engaged; the ground's knowledge of aircraft state and aircraft intent is limited to the present state of the aircraft through surveillance and the cleared flight plan 405 and amendments. Thus, any significant change to future aircraft position or arrival time predicted by the aircraft is reflected in the ground synchronized trajectory 450 much sooner with air monitoring than ground monitoring. Secondly, messaging bandwidth is lower when trajectory downlink is initiated by the aircraft 10 than by the ground 60, because the former requires only a downlink whereas the latter requires an uplink followed by a downlink.

Figure 5A:
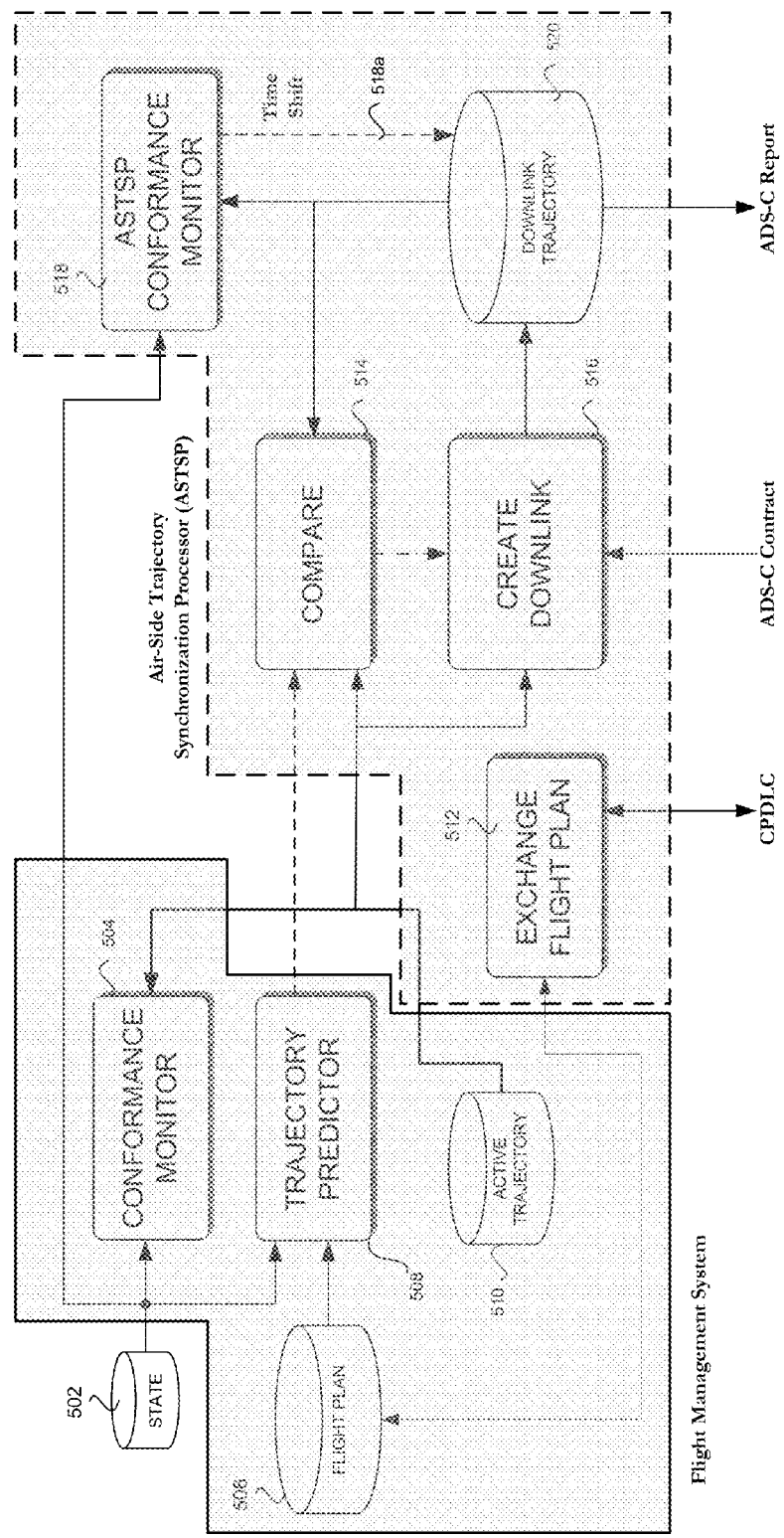
FIG. 5A is an illustration of an air-side trajectory synchronization system in accordance to an embodiment.
Figure 5B:
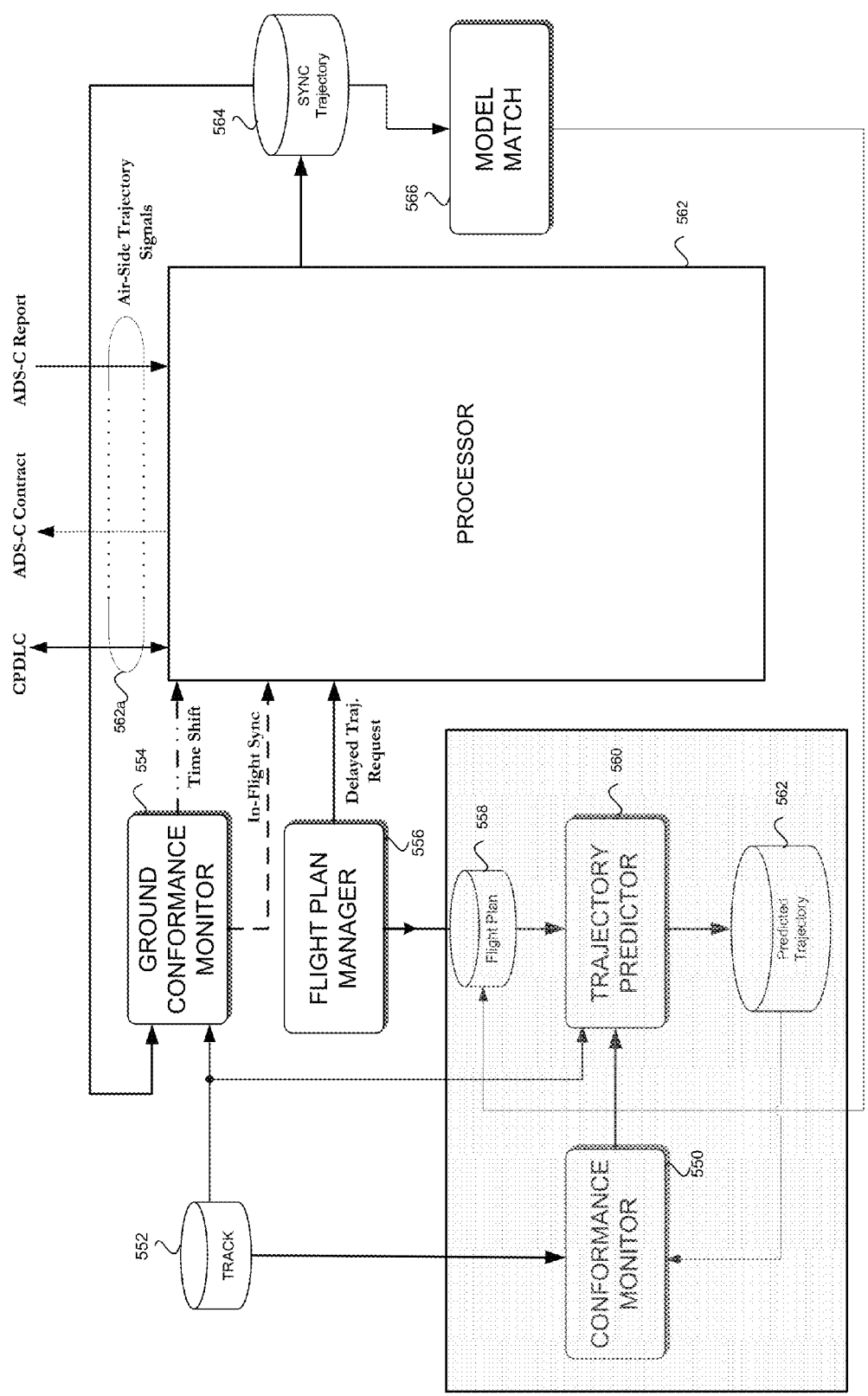
FIG. 5B is an illustration of a ground-side trajectory synchronization system in accordance to an embodiment.

FIG. 5A is an illustration of an air-side trajectory synchronization system in accordance to an embodiment. FIG. 5A and FIG. 5B are system block diagrams showing the interrelationships among various components, including the air (FIG. 5A) and ground (FIG. 5B) sides of the trajectory synchronization processor and the monitors described below. The air side components comprise a monitoring of aircraft state parameters which are stored in memory storage labeled state 502, flight management components such as conformance monitor 504, trajectory predictor 508, stored flight plan 506, active trajectory 510. Another component is the air-side trajectory synchronization processor (ASTSP) comprising a comparator 514, exchange flight plan 512 module, create downlink 516 module, ASTSP conformance monitor 518, and downlink trajectory 520, and data links to the ground side processor. The primary aircraft monitor is a comparator 514 that's triggered every time the existing trajectory is updated such as by conformance monitor 504 and active trajectory 510 or a new trajectory is created by the aircraft's trajectory predictor 508, for whatever reason. It computes one or more differences between the latest trajectory predicted by the aircraft's trajectory predictor 508 and the last trajectory downlinked to the ground by downlink trajectory 520. If any difference exceeds a specified threshold, a trajectory downlink to the ground is initiated at create downlink 516. This threshold may be setup based on operational needs and level of uncertainty, or the difference between air and ground trajectories that can be tolerated. Useful quantities to monitor between active trajectory 510 and last downlinked trajectory 520 include the offset in time or distance between the top-of-climb and top-of-descent points of the trajectories, or the maximum vertical separation between the trajectories at these points. Also useful to monitor are the change in estimated time-of-arrival at key points such as metering fixes or merge points, or the maximum vertical separation within a trajectory segment such as a descent segment. Because the aircraft monitor uses the last downlinked trajectory as a reference for comparison, this trajectory also needs to be time shifted when its corresponding synchronized trajectory on the ground is time shifted. To accomplish this, a second monitor (ASTSP conformance monitor 518) in the aircraft compares the sensed position (state 502) of the aircraft to the projection of that position onto the last downlinked trajectory 520. In a manner similar to the ground monitor described below, if a time difference exceeding a threshold is detected between the sensed (state 502) and projected positions (downlink trajectory 520), a time-shift 518a is applied to the future portion of the last downlinked trajectory. By matching the time thresholds of the air and ground monitors (state 502 and track 552), the time-shifting of the above trajectories can be synchronized.

FIG. 5B is an illustration of a ground-side trajectory synchronization system in accordance to an embodiment. The ground-side components comprise track 552 storage, ground side conformance monitor 554, flight plan manger 556, flight plan 558, trajectory predictor 560, predicted trajectory 562, conformance monitor 550, processor 562, synchronized trajectory 564, and model match 566. A companion conformance monitor 554 on the ground as shown in FIG. 5B compares the observed position of the aircraft such as stored in track 552 to the projection of that position onto the synchronized trajectory 564. If the observed and projected positions differ in horizontal position or altitude by more than respective thresholds, a message 562a is sent to the aircraft to initiate in-flight synchronization by requesting a trajectory downlink at create downlink 516. To minimize messaging, a trajectory downlink is not requested (flight manager 556) if the observed and projected positions differ only in time, with any difference in horizontal or vertical dimension within tolerance. This is because a time difference by itself is most likely caused only by an error in departure time or a difference between actual and predicted wind, and to compensate for this a first-order correction can be applied to the synchronized trajectory simply in the form of a time shift.

Finally, a monitor detects any change in the ground flight plan 558 that may significantly change the predicted trajectory 560. Presumably, a change to the ground flight plan should be accompanied by a corresponding change to the air flight plan 506 by some means external to trajectory synchronization. In that case no action from the ground should be needed. However, in case a controller enters a change into the ground system but neglects to send the change to the aircraft, it is desirable that trajectory synchronization can detect and correct this difference. To ensure this, upon detecting a change in the ground flight plan 558, a trajectory request by flight plan manger 556 is set up to be sent to the air a preset time delay after the detection. If a trajectory downlink is received during this time delay, the trajectory request is cancelled. A trajectory downlink for any reason suffices, because the object is just to force at least one flight plan comparison within a time limit after detecting a flight plan change. The reverse case, consisting of a controller sending an amendment to the flight plan to the pilot via an external mechanism neglects to enter the amendment into the ground automation system, is also handled in a natural way. The amendment gets processed by the air, which is detected by the air monitor which in turn triggers an EPP downlink, thus closing the loop.

Figure 6:
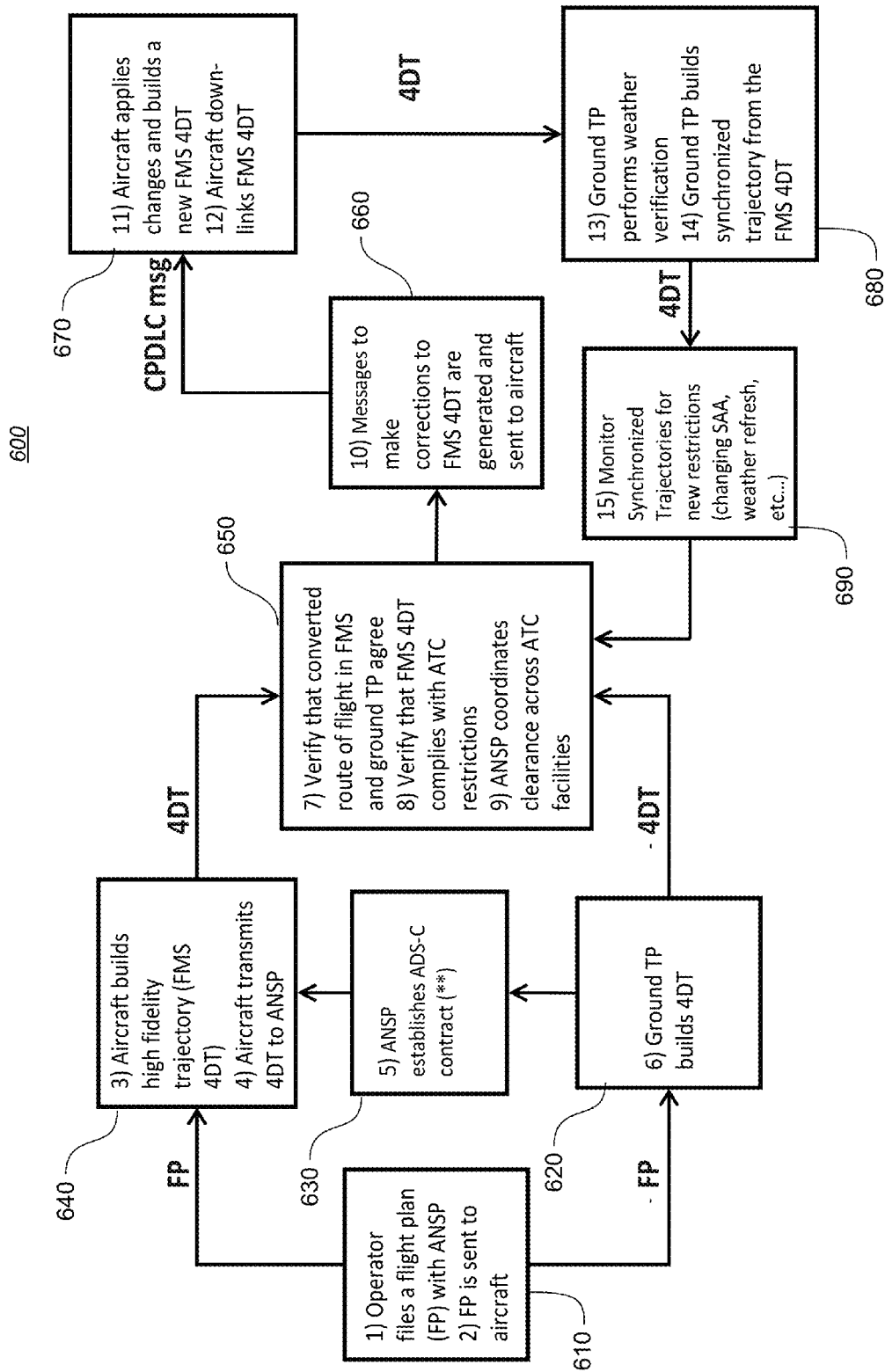
FIG. 6 is a block diagram of a pre-departure trajectory synchronization in accordance to an embodiment.

FIG. 6 is a block diagram of pre-departure trajectory synchronization in accordance to an embodiment.

In step 610, an initial trajectory request: upon reception of the flight plan (FP) by the ground system and having reached a time which is a parameter number of minutes before the estimated departure time (if the flight is internal to the facility or the extended facility—i.e. the NAS—) or before the flight enters the Flight Information Region (FIR)—when the flight originates outside the NAS—the ground system issues a trajectory request (TR) to the air system; the FMS trajectory may be down-linked to the ATC system. In step 620, ground TP builds 4DT from the FP. In step 630 the ANSP establishes ADS-C contract from in order to automatically obtain the 4DT objects created in the FMS. In step 640 the aircraft 10 builds a high fidelity trajectory from the FP and makes it available via ADS-C downlink to the ground systems. In step 650, the high fidelity trajectory of step 640 and the 4DT from the ground TP are verified.

In step 650 verification of route agreement is made by comparing the FMS trajectory with the ground trajectory in order to detect discrepancies in the latitude and longitude information that defines the 2D route. Trajectory comparison is done by a computer executing instructions that perform cusp-to-cusp differencing consisting of the following steps:
 a. Selecting a portion (or one or more portions) of trajectory where synchronization is desired (the complete trajectory may not be subject to synchronization, for instance if the flight is leaving the controlled airspace); (ii) Calling T1 the FMS trajectory, calling T2 the ground trajectory; (iii) Traversing T1 in cusp order, for each cusp perpendicularly project the 2D position of the cusp on T2 (if there is no perpendicular projection then selecting the nearest point as the 'projection' point); (iv) Computing the 2D distance between the cusp and the projection point;
 (b) If the distance is greater than a threshold, then flagging this cusp as discrepant;
 (c) Repeating for all cusps of T1;
 (c.) Repeating the above steps but his time traversing T2;
 (d) Reporting the discrepant cusps. Trajectory comparison can also be made between the Estimated Time of Arrival (ETA) at distinct waypoints along the route of flight.

Further in step 650, verification of restriction compliance is made by insuring that the FMS trajectory (aircraft trajectory) complies with altitude and speed restrictions.

In step 660, instructions are assembled in order to correct for discrepancies detected in step 650 and restriction violations identified in step in step 650; this instructions may be communicated to the operator (pilot or Airline Operations Control Center AOCC) via established air-ground communication systems such as CPDLC.

In step 670, the FMS system applies the changes identified in step 660 and produces a new FMS 4DT. This new 4DT is down-linked to the ground system for processing. The air system down link the FMS trajectory to the ground system.

In step 680, the ground receives from the aircraft (FMS) a four-dimensional trajectory (4DT) in space (latitude, longitude, altitude) and time. Given that the main sources of discrepancies expected between the FMS-generated trajectory and the ATC-generated trajectory may be the rates of change in the altitude and speed during takeoff, initial climb, descent, final approach and landing (i.e. the vertical profile), the downlink of the aircraft 4DT may provide the information needed on the ground for reconstruction of realistic alternative trajectories, if needed.

Continuing with step 680, the ground system may build a trajectory using FMS trajectory cusps. An approach to build the synchronized ground trajectory may be to insert cusps with the same geographic location, altitudes and times as those found in the FMS trajectory; two alternatives may be used to set the speeds and accelerations, depending on the available data in the FMS trajectory: The ground computers in the ATC perform the following instructions to build a synchronized trajectory:
 (1) Approximate the segments to be of constant speed as implied by the segment length and duration (the effective average ground speed is equal to the segment length divided by the segment duration); and
 (2) Compute the acceleration based on the point and wind velocities provided in the FMS trajectory (ADS-C EPP data). For each trajectory segment that is being built the acceleration a can be derived, assuming that it is constant, using the true air speed (TAS) at the beginning of the segment, the wind speed, the duration of the segment T and the length of the segment L: $a=2*(L-v*T)/(T*T)$, where v is the ground speed computed as the vector sum of the true air speed and wind speed; alternatively (because the system is over-determined) the acceleration can be directly computed using the ground speed at the beginning of the segment v0, the ground speed at the end of the segment v1 and the duration of the segment T:$a=(v1-v0)/T$. If the acceleration is truly constant then these two are equivalent. The errors involved in these two approaches may depend on segment duration, therefore means should be provided to allow in step (d) above for the insertion of additional trajectory points (arbitrary Lat/Lon points) so that long segments in the FMS trajectory can be broken into smaller ones to maintain the required fidelity. Longitudinal prediction errors may grow with time and may have adverse effects in functions (such as conflict probe) that depend on trajectories, therefore: accuracy requirements for these functions may dictate the maximum tolerances allowed and in turn the maximum segment length. Segment duration T (or equivalent segment length) can be controlled to limit the size of the discrepancies between the ground trajectory and the FMS trajectory, specifically the maximum longitudinal error within a segment due to non-zero acceleration (b=change of acceleration within the segment) is equal to $error=2*b*T*T*T/81$; the maximum longitudinal error in a segment due to uncertainty in the air speed at the start of the segment (sv) is $error=sv*T/6$; the maximum ground speed error due to assuming constant acceleration when in reality it is not constant is $error=b*T*T/6$; similarly the error in altitude due to vertical acceleration (ah) is $error=ah*T*T/8$, T is segment duration.

The steps described below apply for trajectories that have already passed the first synchronization stage:

In step 690, the trajectories are kept current, fresh, or updated through an updating module that performs the following steps: Initial longitudinal (time) re-conformance: as soon as the ground systems receive a departure or FIR crossing message, the ground trajectory may be longitudinally re-conformed (cusp times may be recomputed to be consistent with time information provided). (i) Conformance monitoring: as the flight progresses, a number of situations may arise that result in loss of synchronization (for instance: change in runway assignment, unforeseen wind changes, errors in wind forecast, tactical intervention by the controller, weather reroutes, velocity variance due to cost index, etc.). For this reason, it may be necessary that the ground system checks the sensed position reports provided by the surveillance system against the active trajectory and in cases of out of conformance detections, corrections may be applied to the active trajectory; this operation may entail a re-synch process consisting of the steps a through g above. Updating as a result of wind related forces.

In step 690, trajectory synchronization is needed to compensate for wind conditions. Air-ground wind model discrepancies may potentially be an additional source of significant errors leading to two type of problems: (1) a synchronized trajectory going out of conformance repeatedly in short time intervals, thus triggering multiple re-synch operations, and (2) an aircraft flying a conflict free synchronized trajectory encountering a real conflict (unpredicted because of wind discrepancies) in the future that will cause tactical intervention and thus nullify the benefits of synchronization (and possibly even introduce penalties). Errors in wind data and discrepancies in wind models between air-ground systems may result in longitudinal errors (sx) that grow with prediction time (T) as sx=T sv, where sv=ground speed error and could become a significant source of error. Discrepancies in wind forecasts may result in invalid conflict probe predictions. Using FMS wind data in the ground system may not be an option because conflict predictions of neighboring aircraft using different wind data would result in false or missed alerts. Conflict probe may require the wind model to be consistently applied to all aircraft. If the wind data used by the FMS is made available as part of the FMS trajectory downlink (as provided in the ADS-C EPP data), the ground system may check for consistency of wind models. If in addition to the FMS wind data there is also a wind model age (time since forecast was computed, such as provided by the ADS-C MET data message) or wind accuracy (figure of merit) information, the ground system may assess the reliability of the wind data used by the FMS. Accordingly, if the ground systems deems that the wind data used by the FMS is stale or unreliable then the ground system may up-link new wind data to the aircraft to be used by the wind blending algorithms in the FMS; on the other hand if the wind data in the FMS is "fresh" and if there is a significant discrepancy (i.e. large relative to intrinsic wind models errors), then the ground system may add prediction buffers to account for larger prediction errors (conflict probe, for instance, can be performed adding a buffer to accommodate the uncertainty in speed).

The disclosed embodiments meet the need in the art to provide a solution to the problems of conventional systems for the following reasons:

(a) The disclosed embodiments may take into account user preferences: by using the (restriction compliant and laterally synchronized) down-linked FMS trajectory to build the ground trajectory all of the optimization choices made by the FMS to build its own trajectory, may be automatically incorporated in the ground system (for instance if the FMS modeled an optimized descent, the vertical profile in the ground system may reflect such optimization).

(b) By exchanging a combination of aircraft intent (AI) data and trajectory data, the disclosed embodiments may solve the problems associated with the individual limitations associated with each one of these data items (as described in the previous item).

(c,) The trajectory synchronization of the disclosed embodiments may be highly dynamic and thus allows for required adjustments that arise in realistic situations.

The disclosed embodiments may build on current or planned technologies and concepts (CPDLC, data comm., ARINC 702A, RTCA SC-214 ADS-C, etc), and may thus allow for an initial implementation in a mixed equipage environment and a smooth evolution of the ATC system towards TBO.

Figure 7:
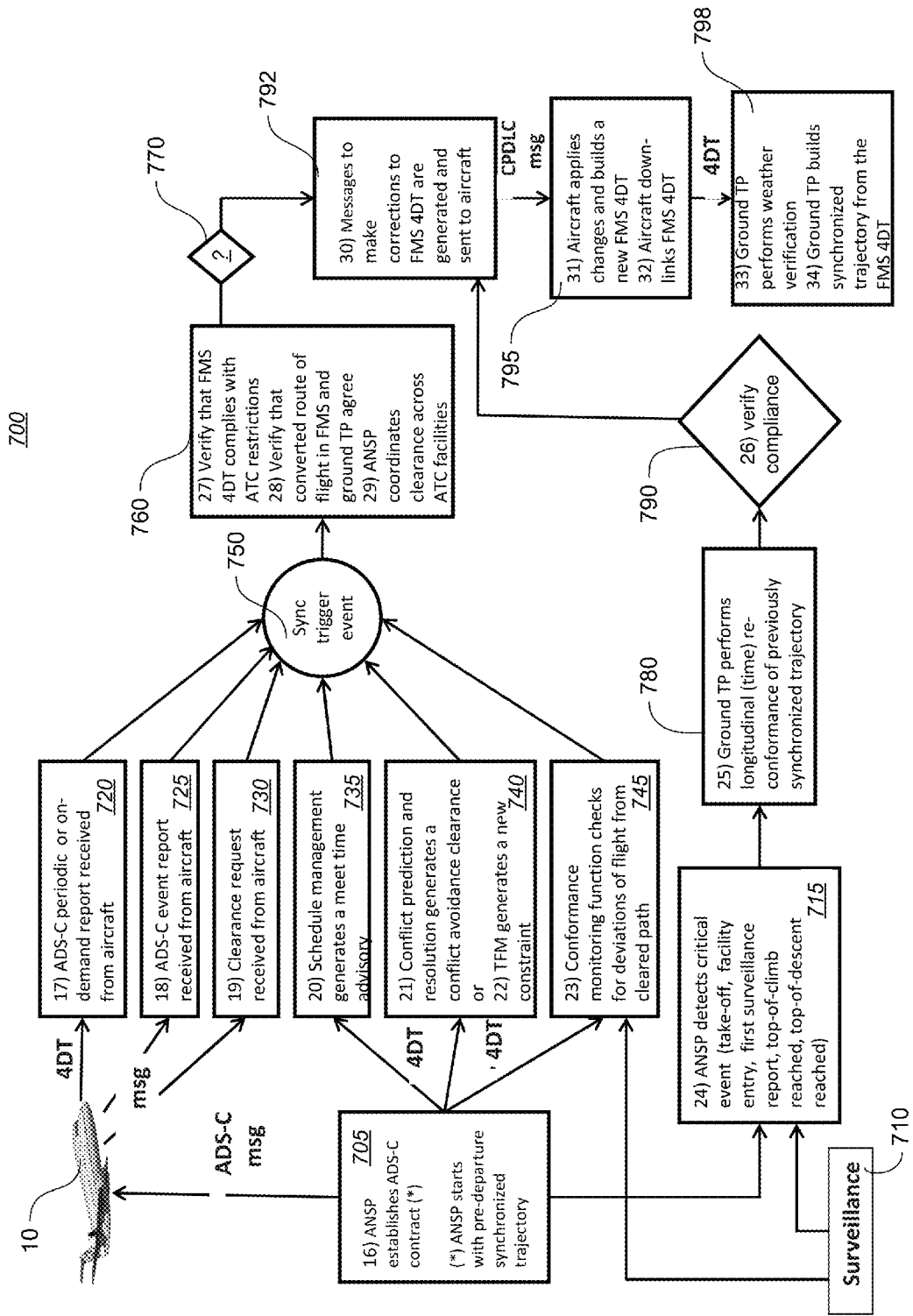
FIG. 7 is a block diagram of an in-flight trajectory synchronization in accordance to an embodiment.

FIG. 7 is a block diagram of an in-flight trajectory synchronization in accordance to an embodiment.

In action 710, surveillance data may also be captured to aid in trajectory creation. In action 715, ANSP detects critical event (take-off, facility entry, first surveillance report, top-of-climb reached, top-of-descent reached, disturbances 101, periodic trigger). The information from action 715 is then used by action 780 so that ground TP can perform longitudinal (time) re-conformance of previously synchronized trajectory. In action 790, the re-conformance is used to verify compliance of trajectories. The result of the verification is sent to action 792 for further processing. The initial trajectory, action 705, is sent from the aircraft 10 in accordance with the ADS-C contract request, other ground automation components that use the trajectory (action 735-745), and Air Traffic Service Provider (action 715). The aircraft 10 performs processing of the initial trajectory to produce 4DT ADS-C periodic or on-demand report (Action 720) in accordance to the process outlined in FIG. 1, ADS-C event report (step 725), and clearance request (step 730). In step 735, the initial trajectory is used by a schedule management module to generate a meet time advisory. In step 740, the initial trajectory is used by a conflict prediction and resolution module to generate a conflict avoidance clearance or by a TFM to generate a new constraint. In step 745, the initial trajectory is used by a conformance monitoring function checks for deviations of flight from cleared path. Steps 720, 725, 730, 735, 740, 745 are processed in step 750 to determine a synchronized trigger event. If a synchronized triggering event is discovered in step 760 control is passed to action 760 for further processing. In step 760, Verify that FMS 4DT complies with ATC restrictions, verify that converted route of flight in FMS and ground TP agree, and ANSP coordinates clearance across ATC facilities. If the discrepancies are discovered in step 760 and 750 a message is generated requesting modification of the trajectory. Step 792 a messages to make corrections to FMS 4DT are generated and sent to aircraft in the event of discrepancies (step 760) or failure to verify compliance (step 790). In step 795, aircraft 10 applies changes and builds a new FMS 4DT and Aircraft 10 down-links FMS 4DT. In action 798, ground TP performs weather verification and ground TP builds synchronized trajectory from the FMS 4DT.

Figure 8:
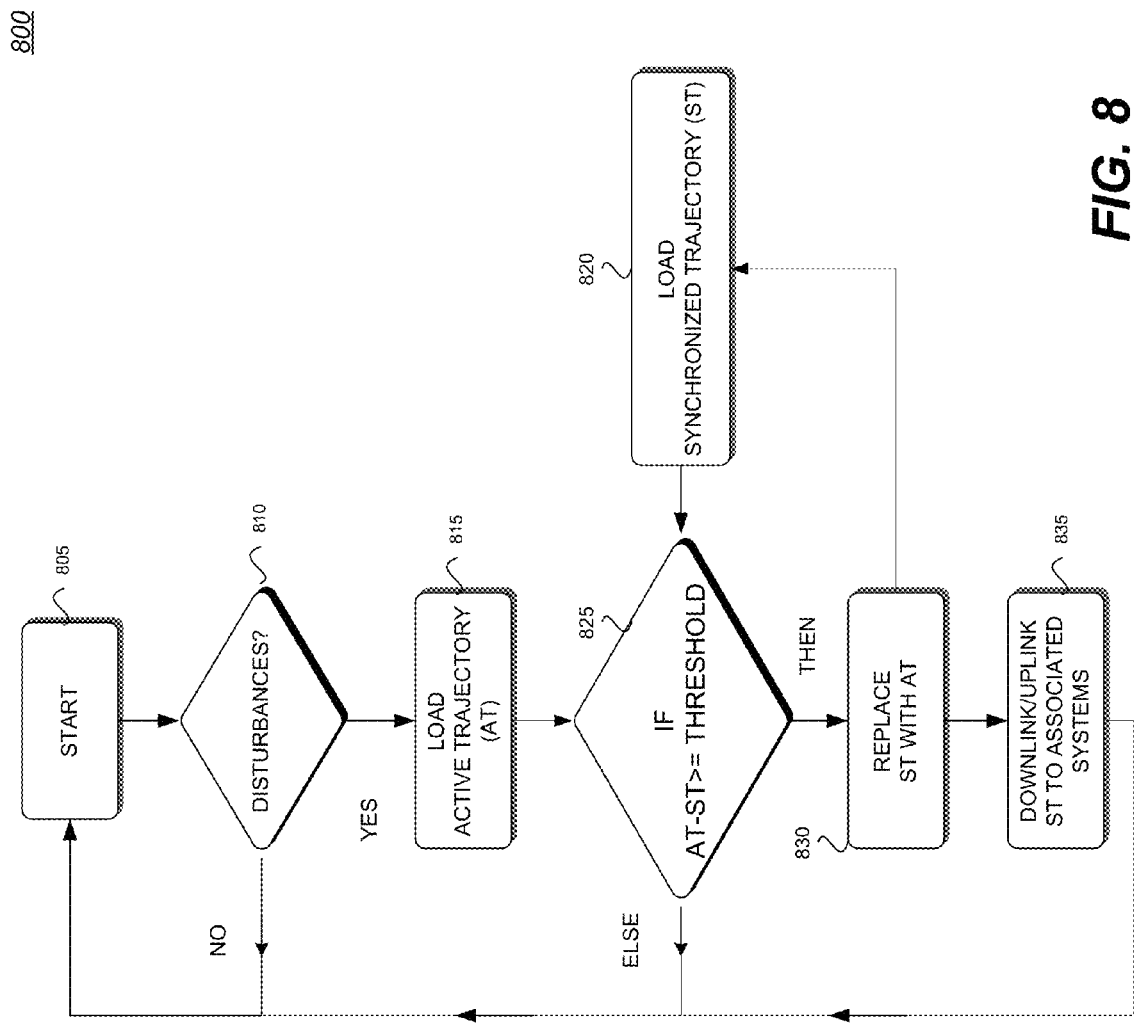
FIG. 8 is a flowchart of a dynamic trajectory synchronization process in accordance to an embodiment.
Figure 9:
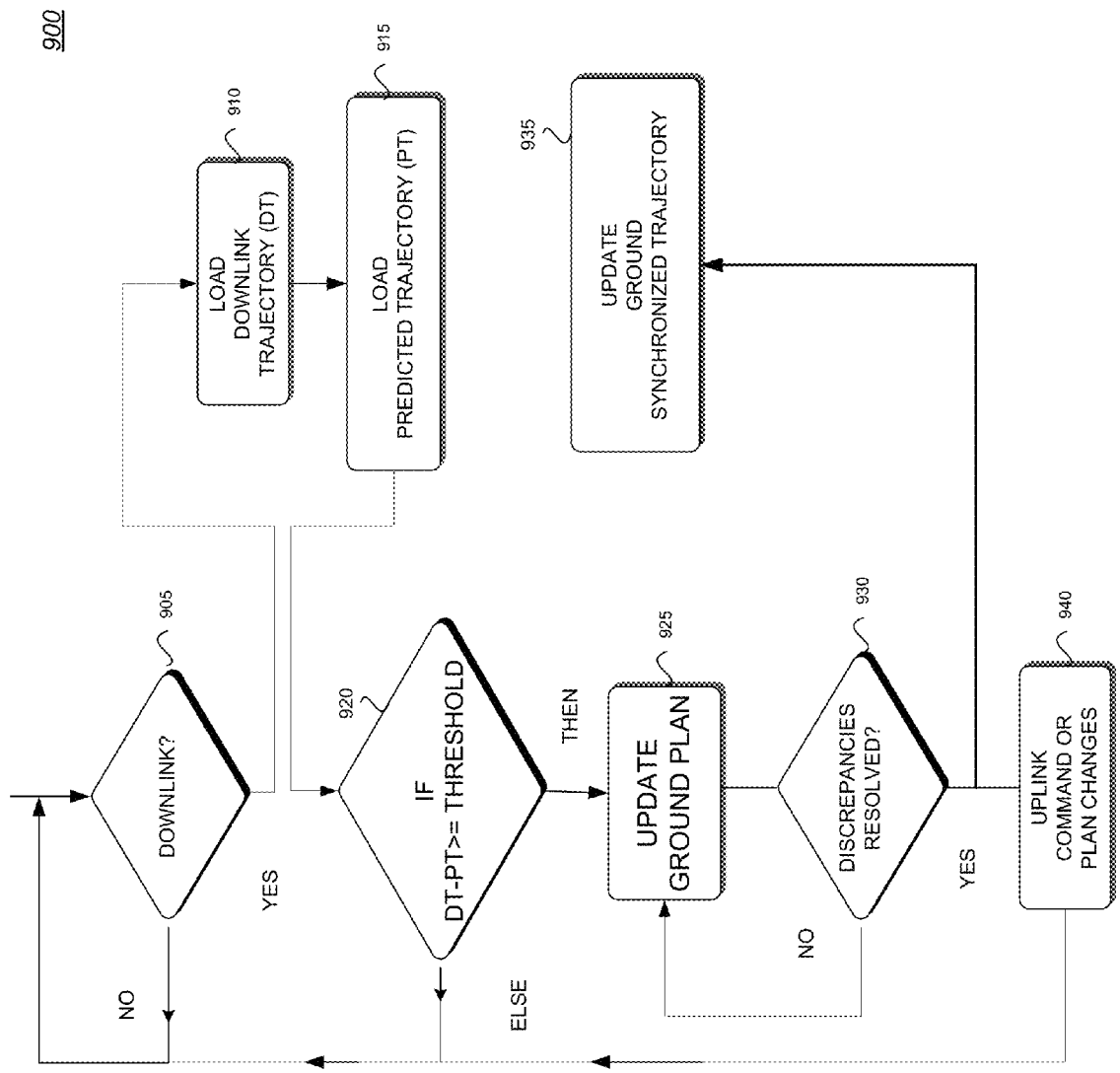
FIG. 9 is a flowchart for downlink processing to maintain dynamic trajectory synchronization in accordance to an embodiment.

FIG. 8 is a flowchart of a dynamic trajectory synchronization process 800 in accordance to an embodiment. Process 800 monitors the deviations on both the air and ground and initiating data exchanges as needed to bring the trajectories back into alignment. Process 800 begins with action 805 where the process is started. The start of the process could be the start of the flight, when the aircraft is in the runaway awaiting takeoff, or when the aircraft enters the FIR (flights originating outside the NAS). Once the process is started control is passed to action 810 for processing. In action 810, the process monitors for disturbances that may cause a trajectory change. As noted above disturbances can be detected by aircraft monitoring (state changes) or by changing data on the ground (Uplink command), or a triggering signal that prompts a comparison of the current trajectory with the last know good trajectory or synchronized trajectory. If no disturbance is detected then the process goes back to the beginning at action 805. If a disturbance is detected then control is passed to action 815 for processing. In action 815, the active trajectory is loaded so it can be compared to the synchronized trajectory. Also, at the same time that active trajectory is loaded, in action 820 the synchronized trajectory is loaded for comparison with the active trajectory. In action 825, the two trajectories are compared. In action 825, if the comparing indicates a difference between the active trajectory and the synchronized trajectory, then performing the actions of: updating the synchronized trajectory with the active trajectory (action 830); and downlinking the synchronized trajectory or uplinking a command to modify a flight plan to an external system as part of action 835. Else, action 825 could send the process back to the beginning (action 805) indicating that the aircraft (active trajectory) is synchronized FIG. 9 is a flowchart for downlink processing to maintain dynamic trajectory synchronization in accordance to an embodiment.

Process 900 begins when the ground system receives a downlink of the air synchronization. The process loads the downlink trajectory at action 910 along with the predicted trajectory from action 915. A comparison (action 930) is made to ascertain the differences if any in the trajectories. If differences are not found, the downlink trajectory replaces the ground trajectory and the process goes back to action 905 and awaits the next downlink from the aircraft. If differences are found then the ground system adjust the ground plan (action 925) inputs resulting in an updated ground trajectory. The action of updating the ground plan is continued until all or substantially all the discrepancies between the air and ground trajectories are resolved. Action 930 ensures that discrepancies are resolved before updating the ground trajectory or the air trajectory. The mechanism of resolving most or all the discrepancies prevents the resending of amendments that have already been sent and to give the air a chance to update its flight plan. Any ground initiated amendment is uplinked to the air (action 940), followed by application of the amendment (action 935), subsequent trajectory re-prediction, and downlinking of the new trajectory, either via triggering by the air-side comparator or by some other means.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components each processing the content in various possible ways. It does not necessarily need to be one system used by all end users. Accordingly, the appended claims and their legal equivalents should only define the disclosure, rather than any specific examples given.

What is claimed is:

1. A method to maintain trajectory synchronization comprising:

Comparing, using a processor, an active trajectory with a synchronized trajectory, wherein the comparison is triggered by at least one disturbance, periodic trigger, communication event between different trajectory systems, or downlink/uplink event;

if the comparing indicates a difference between the active trajectory and the synchronized trajectory, then performing the actions of:

updating the synchronized trajectory with the active trajectory; and transferring the synchronized trajectory or sending a command to modify a flight plan to an external system;

Wherein one ground computer performs the action of when a downlink is received, initiating a comparison process where the downlink is compared to a downlinked synchronized trajectory and a ground predicted trajectory for the aircraft, and if the comparison indicates a difference between the synchronized trajectory and the ground predicted trajectory, then initiating a synchronization process, else a local synchronized trajectory is updated with the downlinked synchronized trajectory;

wherein the disturbance is at least one of a change detected by an aircraft, change data from an external source, or a periodic trigger;

wherein the change detected by an aircraft is at least one of atmospheric condition change, pilot input change, airline input change, or other state measurement;

wherein the change data from an external source is at least one of flow management, a separation from other aircraft command, change in convective weather, a special use airspace command, a scheduling requirement, a trajectory downlink, or a command uplink;

wherein comparing the downlinked synchronized trajectory with a ground predicted trajectory is matching a plurality parameters comprising ground route, lateral route, altitude restrictions, and speed restrictions;

wherein the synchronization process performs ground initiated amendment to a flight plan and uplinking of a command to the aircraft to modify its plan only after a substantial or all discrepancies between the flight plan and the downlinked synchronized trajectory are resolved.

2. The method in accordance to claim 1, wherein the disturbance is at least one of a change detected by an aircraft, change data from an external source, or a periodic trigger.

3. The method in accordance to claim 2, wherein the change detected by an aircraft is at least one of atmospheric condition change, pilot input change, airline input change, or a change to a predicted trajectory.

4. The method in accordance to claim 3, wherein the change data from an external source is at least one of flow management restrictions or commands, a separation from other aircraft command, change in convective weather, a special use airspace restriction, a scheduling requirement, a trajectory downlink, or a command uplink.

5. The method in accordance to claim 3, the method further comprising:
if a downlinked synchronized trajectory is received, then performing the action of:
comparing the downlinked synchronized trajectory with a ground predicted trajectory for the aircraft;
if the comparison indicates a difference between the synchronized trajectory and the ground predicted trajectory, then initiating a synchronization process;
else a local synchronized trajectory is updated with the downlinked synchronized trajectory.

6. The method in accordance to claim 5, wherein the synchronization process comprises invoking a ground initiated amendment to a flight plan and communicating any ground initiated amendment to the flight plan to the aircraft.

7. The method in accordance to claim 5, wherein comparing the downlinked synchronized trajectory with a ground predicted trajectory is matching a plurality of parameters comprising ground route, lateral route, altitude restrictions, speed restrictions and non penetration of special use airspaces or flow constrained areas.

8. The method in accordance to claim 5, wherein ground route or lateral route comprises at least one of an en route segment, and departure segment or arrival segment which relate to a set of airport, runway, and terminal procedure names.

9. A system to maintain trajectory synchronization, the system comprising:
a computer executing an interface to exchange data between an aircraft and a ground system, wherein the exchanged data relates to a series of points associated with various flight path points or trajectory change points for an aircraft; and
a processor coupled to a memory, wherein the memory comprises program instructions that cause the processor to perform operations comprising:
comparing an active trajectory with a synchronized trajectory, wherein the comparison is triggered by at least one disturbance, periodic trigger, communication event between different trajectory systems, or downlink/uplink event;
if the comparing indicates a difference between the active trajectory and the synchronized trajectory, then performing the actions of:
updating the synchronized trajectory with the active trajectory; and
transferring the synchronized trajectory or sending a command to modify a flight plan to an external system;
At least one ground computer to perform the action of when a downlink is received, initiating a comparison process where the downlink is compared to a downlinked synchronized trajectory and a ground predicted trajectory for the aircraft, and if the comparison indicates a difference between the synchronized trajectory and the ground predicted trajectory, then initiating a synchronization process, else a local synchronized trajectory is updated with the downlinked synchronized trajectory;

wherein the disturbance is at least one of a change detected by an aircraft, change data from an external source, or a periodic trigger;

wherein the change detected by an aircraft is at least one of atmospheric condition change, pilot input change, airline input change, or other state measurement;

wherein the change data from an external source is at least one of flow management, a separation from other aircraft command, change in convective weather, a special use airspace command, a scheduling requirement, a trajectory downlink, or a command uplink;

wherein comparing the downlinked synchronized trajectory with a ground predicted trajectory is matching a plurality parameters comprising ground route, lateral route, altitude restrictions, and speed restrictions;

wherein the synchronization process performs ground initiated amendment to a flight plan and uplinking of a command to the aircraft to modify its plan only after a substantial or all discrepancies between the flight plan and the downlinked synchronized trajectory are resolved.

10. The system in accordance to claim 9, wherein the disturbance is at least one of a change detected by an aircraft, change data from an external source, or a periodic trigger.

11. The system in accordance to claim 10, wherein the change detected by an aircraft is at least one of atmospheric condition change, pilot input change, airline input change, or change to a predicted trajectory.

12. The method in accordance to claim 11, wherein the change data from an external source is at least one of flow management restrictions or commands, a separation from other aircraft command, change in convective weather, a special use airspace command, a scheduling requirement, a trajectory downlink, or a command uplink.

13. The system in accordance to claim 11, the processor further performing:
    if a downlinked synchronized trajectory is received, then performing the action of:
        comparing the downlinked synchronized trajectory with a ground predicted trajectory for the aircraft;
        if the comparison indicates a difference between the synchronized trajectory and the ground predicted trajectory, then initiating a synchronization process;
        else a local synchronized trajectory is updated with the downlinked synchronized trajectory.

14. The system in accordance to claim 13, wherein the synchronization process comprises invoking a ground initiated amendment to the flight plan and communicating any ground initiated amendment to the flight plan to the aircraft.

15. The system in accordance to claim 13, wherein comparing the downlinked synchronized trajectory with a ground predicted trajectory is matching a plurality of parameters comprising ground route, lateral route, altitude restrictions, speed restrictions and non penetration of special use airspaces or flow constrained areas.

16. A method to maintain trajectory synchronization between an aircraft system and a ground system, the method comprising:
    when a downlink is received, initiating a comparison, using a processor, process where the downlink is compared to a downlinked synchronized trajectory and a ground predicted trajectory for the aircraft, and if the comparison indicates a difference between the synchronized trajectory and the ground predicted trajectory, then initiating a synchronization process, else a local synchronized trajectory is updated with the downlinked synchronized trajectory;
    wherein the disturbance is at least one of a change detected by an aircraft, change data from an external source, or a periodic trigger;
    wherein the change detected by an aircraft is at least one of atmospheric condition change, pilot input change, airline input change, or other state measurement;
    wherein the change data from an external source is at least one of flow management, a separation from other aircraft command, change in convective weather, a special use airspace command, a scheduling requirement, a trajectory downlink, or a command uplink;
    wherein comparing the downlinked synchronized trajectory with a ground predicted trajectory is matching a plurality parameters comprising ground route, lateral route, altitude restrictions, and speed restrictions;
    wherein the synchronization process performs ground initiated amendment to a flight plan and uplinking of a command to the aircraft to modify its plan only after a substantial or all discrepancies between the flight plan and the downlinked synchronized trajectory are resolved;
    wherein the synchronization process performs ground initiated amendment to a flight plan and communicating a command to the aircraft to modify its plan only after a substantial or all discrepancies between the flight plan and the downlinked synchronized trajectory are resolved.

17. The method in accordance to claim 16, wherein comparing the downlinked synchronized trajectory with a ground predicted trajectory is matching a plurality parameters comprising ground route, lateral route, altitude restrictions, and speed restrictions.

18. The method in accordance to claim 16, wherein ground route or lateral route comprises at least one of an en route segment, and departure segment or arrival segment which relate to a set of airport, runway, and terminal procedure names.

19. The method in accordance to claim 16, the method further comprising:
    when a disturbance or a communication is received from a ground system comparing an active trajectory with a synchronized trajectory, and if the comparing indicates a difference between the active trajectory and the synchronized trajectory, then performing the actions of:
    updating the synchronized trajectory with the active trajectory and downlinking the synchronized trajectory.

20. The method in accordance to claim 19, wherein the disturbance is at least one of a change detected by an aircraft, change data from an external source, or a periodic trigger.

21. The method in accordance to claim 20, wherein the change detected by an aircraft is at least one of atmospheric condition change, pilot input change, airline input change, or other state measurement.

22. The method in accordance to claim 21, wherein the change data from an external source is at least one of flow management, a separation from other aircraft command, change in convective weather, a special use airspace restriction, a scheduling requirement, a trajectory downlink, or a command uplink.

23. A non-transitory machine-accessible medium that provides instructions to maintain trajectory synchronization between an aircraft system and a ground system, which when accessed, cause a machine to perform operations, the non-transitory machine-accessible medium comprising:
    code for causing at least one aircraft computer to perform the action of when a disturbance or a communication is received from a ground system comparing an active trajectory with a synchronized trajectory, and if the comparing indicates a difference between the active trajectory and the synchronized trajectory, then performing the actions of: updating the synchronized trajectory with the active trajectory and downlinking the synchronized trajectory; and
    code for causing at least one ground computer to perform the action of when a downlink is received, initiating a comparison process where the downlink is compared to a downlinked synchronized trajectory and a ground predicted trajectory for the aircraft, and if the comparison indicates a difference between the synchronized trajectory and the ground predicted trajectory, then initiating a synchronization process, else a local synchronized trajectory is updated with the downlinked synchronized trajectory;
    wherein the disturbance is at least one of a change detected by an aircraft, change data from an external source, or a periodic trigger;
    wherein the change detected by an aircraft is at least one of atmospheric condition change, pilot input change, airline input change, or other state measurement;
    wherein the change data from an external source is at least one of flow management, a separation from other aircraft command, change in convective weather, a special use airspace command, a scheduling requirement, a trajectory downlink, or a command uplink;
    wherein comparing the downlinked synchronized trajectory with a ground predicted trajectory is matching a plurality parameters comprising ground route, lateral route, altitude restrictions, and speed restrictions;

wherein the synchronization process performs ground initiated amendment to a flight plan and uplinking of a command to the aircraft to modify its plan only after a substantial or all discrepancies between the flight plan and the downlinked synchronized trajectory are resolved.

* * * * *